United States Patent [19]

Murray et al.

[11] Patent Number: 5,842,142
[45] Date of Patent: Nov. 24, 1998

[54] LEAST TIME ALTERNATE DESTINATION PLANNER

[75] Inventors: Daniel J. Murray, Mill Creek; John C. Griffin, III, Tacoma; Patricia S. Ness, Seattle; Clement V. Paulson, Renton; George W. Schraw, Federal Way; Bruce L. Turner, Lynnwood; Thomas E. Twiggs, Bellevue; Henry V. VonJouanne, Renton, all of Wash.

[73] Assignee: The Boeing Company, Seattle, Wash.

[21] Appl. No.: 440,731

[22] Filed: May 15, 1995

[51] Int. Cl.⁶ .................................................. G06F 165/00
[52] U.S. Cl. ........................... 701/16; 701/122; 701/201; 701/204; 340/948; 340/951; 340/979
[58] Field of Search ..................................... 364/446, 444, 364/460, 462, 424.02, 428, 441, 424.06, 451; 340/973, 948, 949, 951, 979

[56] References Cited

U.S. PATENT DOCUMENTS

| | | | |
|---|---|---|---|
| 4,086,632 | 4/1978 | Lions | 364/444 |
| 4,692,869 | 9/1987 | King et al. | 364/448 |
| 4,774,670 | 9/1988 | Palmieri | 364/446 |
| 5,041,982 | 8/1991 | Rathnam | 364/443 |
| 5,121,325 | 6/1992 | DeJonge | 364/442 |
| 5,398,186 | 3/1995 | Nakhla | 364/428 |
| 5,408,413 | 4/1995 | Gonser et al. | 244/182 |
| 5,457,634 | 10/1995 | Chakravarty | 340/994 |
| 5,574,647 | 11/1996 | Liden | 364/446 |

Primary Examiner—Tan Q. Nguyen
Attorney, Agent, or Firm—Christensen O'Connor Johnson & Kindness PLLC

[57] ABSTRACT

An alternate destination planner for searching a navigation database in an aircraft and identifying a plurality of alternate destinations at which the aircraft can land in the event of an emergency. For each identified alternate destination, the alternate destination planner calculates an estimated time of arrival (ETA) and an amount of fuel remaining upon arrival at the destination. The calculation of the ETA and the remaining fuel is based on user-modifiable parameters of aircraft speed, aircraft altitude, wind direction and speed, outside air temperature, and the type of routing the aircraft will follow from a diversion point to the alternate destination. The plurality of alternate destinations are displayed to a pilot of the aircraft according to the ETA to each alternate destination, with the closest alternate destination by time listed first. The plurality of alternate destinations are also displayed to the pilot on a map of the surrounding region that is provided to the pilot on a navigation display. A pilot may select and divert to one of the plurality of alternate destinations using a minimal number of keystrokes on a control display unit.

29 Claims, 18 Drawing Sheets

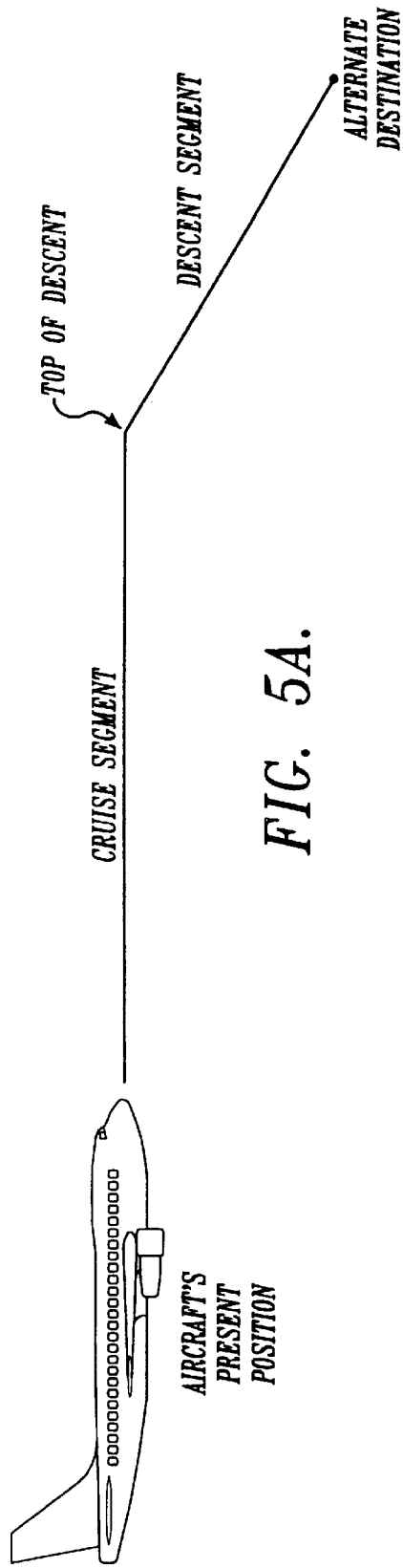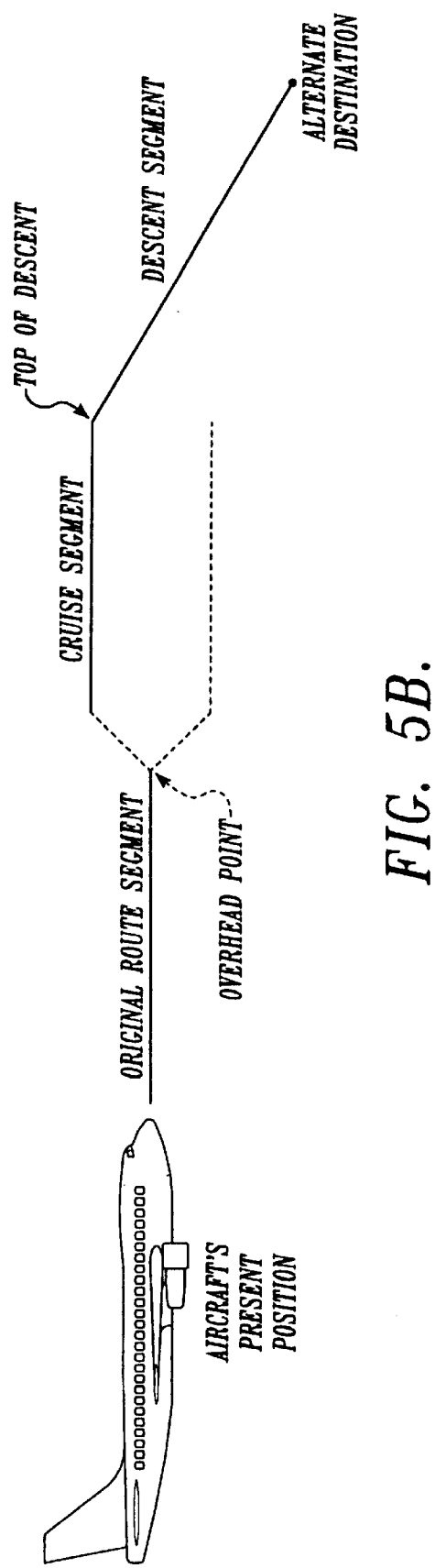

```
                           ┌─────────────────────────────────┐      ╭─300
                           │           ALTN         1/2      │
                    ┌──┐   │         ETA      FUEL           │   ┌──┐
                    │1L│   │  KBIL   1730Z    25.0 >         │   │1R│
                    └──┘   │                                 │   └──┘
                    ┌──┐   │  KRAP   1735Z    23.7 >         │   ┌──┐
                    │2L│   │                                 │   │2R│
                    └──┘   │                                 │   └──┘
                    ┌──┐   │  KDEN < SEL >  1750Z   20.0 >   │   ┌──┐
                    │3L│   │                                 │   │3R│
                    └──┘   │                                 │   └──┘
                    ┌──┐   │  KBOI   1815Z    13.7 >         │   ┌──┐
                    │4L│   │                                 │   │4R│
                    └──┘   │                                 │   └──┘
                    ┌──┐   │    ALTN         ALTN/INHIBIT    │   ┌──┐
                    │5L│   │  < REQUEST      ----/----       │   │5R│
                    └──┘   │                                 │   └──┘
                    ┌──┐   │    WXR            KDEN          │   ┌──┐
                    │6L│   │  < REQUEST      DIVERT NOW >    │   │6R│
                    └──┘   └─────────────────────────────────┘   └──┘
```

```
                           ┌─────────────────────────────────┐      ╭─302
                           │         MOD ALTN       1/2      │
                    ┌──┐   │         ETA      FUEL           │   ┌──┐
                    │1L│   │  KBIL   1730Z    25.0 >         │   │1R│
                    └──┘   │                                 │   └──┘
                    ┌──┐   │  KRAP   1735Z    23.7 >         │   ┌──┐
                    │2L│   │                                 │   │2R│
                    └──┘   │                                 │   └──┘
                    ┌──┐   │  KDEN < SEL >  1750Z   20.0 >   │   ┌──┐
                    │3L│   │                                 │   │3R│
                    └──┘   │                                 │   └──┘
                    ┌──┐   │  KBOI   1815Z    13.7 >         │   ┌──┐
                    │4L│   │                                 │   │4R│
                    └──┘   │                                 │   └──┘
                    ┌──┐   │    ALTN         ALTN/INHIBIT    │   ┌──┐
                    │5L│   │  < REQUEST      ----/----       │   │5R│
                    └──┘   │                                 │   └──┘
                    ┌──┐   │    WXR          DIVERT KDEN     │   ┌──┐
                    │6L│   │  < REQUEST        SELECTED      │   │6R│
                    └──┘   └─────────────────────────────────┘   └──┘
```

*FIG. 6A.*

```
                              ┌─304
   ┌─────────────────────────┐
   │      MOD KDEN ALTN   3/4│
[1L]│   VIA           ALT     │[1R]
   │ DIRECT TO < SEL >  FL290│
[2L]│                  SPD    │[2R]
   │                   .780  │
[3L]│                  WIND   │[3R]
   │                 340°/10 │
[4L]│                 ALT/OAT │[4R]
   │                 ----/---°C│
[5L]│ < ENG OUT    KDEN ETA/FUEL│[5R]
   │                1430Z/85.0│
[6L]│---------------- DIVERT KDEN│[6R]
   │ < ERASE        SELECTED │
   └─────────────────────────┘

┌─306
   ┌─────────────────────────┐
   │     MOD RTE 1 LEGS   1/4│
[1L]│  128°       153NM       │[1R]
   │ KDEN           .780/FL190│
[2L]│  -----                  │[2R]
   │                         │
[3L]│                         │[3R]
   │                         │
[4L]│                         │[4R]
   │                         │
[5L]│                         │[5R]
   │-------------------------│
[6L]│ < ERASE       RTE DATA >│[6R]
   └─────────────────────────┘
```

|  |  | ALTN |  | 1/2 |  |
|---|---|---|---|---|---|
| 1L | KBIL | ETA 1730Z | FUEL 25.0 > | | 1R |
| 2L | KRAP | 1735Z | 23.7 > | | 2R |
| 3L | KDEN < SEL > | 1750Z | 20.0 > | | 3R |
| 4L | KBOI | 1815Z | 13.7 > | | 4R |
| 5L | ALTN < REQUESTING | | ALTN/INHIBIT ----/---- | | 5R |
| 6L | WXR < REQUEST | | DIVERT KDEN SELECTED | | 6R |

322

|  |  | ALTN |  | 1/2 |  |
|---|---|---|---|---|---|
| 1L | KBIL | ETA 1730Z | FUEL 25.0 > | | 1R |
| 2L | KRAP | 1735Z | 23.7 > | | 2R |
| 3L | KDEN < SEL > | 1750Z | 20.0 > | | 3R |
| 4L | KBOI | 1815Z | 13.7 > | | 4R |
| 5L | ALTN < REQUEST SENT | | ALTN/INHIBIT ----/---- | | 5R |
| 6L | WXR < REQUEST | | DIVERT KDEN SELECTED | | 6R |

*FIG. 7A.*

```
              ALTN UPLINK        1/2
       1           ETA         FUEL
   KCYS < A >     1830Z        20.0 >
       2
   KDEN           1845Z        18.7 >
       3
   KLNK           1905Z        17.0 >
       4
   KMSP           1920Z        16.0 >
                             ALTN/INHIBIT
                              ----/----
   ------------- ALTN DATA -------------
   < REJECT                   ACCEPT >
   ALTN UPLINK
```

— 324

```
           KCYS ALTN UPLINK    1/4
       VIA                    ALT
   DIRECT TO < SEL >         FL 310
                              SPD
   LOO OFFSET                 .780
   OVERHEAD                   WIND
   RAP                       270°/20
                             ALT/OAT
                            FL270/-34°C
   < ENG OUT              KCYS ETA/FUEL
                            1430Z/65.0
   --------------------       KCYS
   < ALTN
   ALTN UPLINK
```

LEAST TIME ALTERNATE DESTINATION PLANNER

FIELD OF THE INVENTION

The present invention relates to flight management systems for aircraft and, more particularly, to flight management systems that provide emergency landing information to a pilot.

BACKGROUND OF THE INVENTION

It has become increasingly common for large commercial aircraft to incorporate an alternate destination planner in their flight management systems to provide the pilot of the aircraft with information about alternate landing destinations. Alternate destination planners currently incorporated in aircraft generally contain a database of airports from which a list of alternate destinations at which the aircraft can land may be selected and displayed. In addition to listing the alternate landing locations, alternate destination planners typically provide arrival data such as the distance to each alternate destination, the estimated time until arrival at each alternate destination, and the estimated amount of fuel remaining upon landing at each alternate destination. The alternate landing destination information is usually only used in emergency situations that would prevent the aircraft from landing at the intended destination such as inclement weather of the intended destination or an onboard emergency.

During an emergency situation, the pilot of the aircraft is apprised by the alternate destination planner of a number of alternate destinations to which the aircraft can be diverted. The decision of which destination to select is ultimately made by the pilot, who may base his or her decision upon a number of factors, including the flight time to the alternate destination, the emergency facilities contained at the alternate destination, and the length of the runway at the alternate destination. Providing the pilot of the aircraft an onboard list of alternate destinations is more efficient than having the pilot contact air traffic control to determine the nearest alternate destination. Instead of relying upon an air traffic controller to make critical decisions about how to route the aircraft, the alternate destination planner provides the pilot with sufficient onboard information to make an autonomous decision during flight before communicating the decision to air traffic control.

While it has been recognized that having an alternate destination planner on an aircraft greatly facilitates the handling of emergency situations, the current generation of alternate destination planners still require significant pilot effort in order to change the course of the aircraft and divert to an alternate destination. One alternate destination planner currently in use is disclosed in U.S. Pat. No. 5,398,186, entitled "Alternate Destination Predictor for Aircraft" and commonly assigned to The Boeing Company (herein expressly incorporated by reference). The '186 patent discloses a modification to the flight management computer (FMC) that provides a pilot of an aircraft with a list of alternate landing destinations at which the aircraft can be landed in the event of an emergency. For each alternate landing destination displayed, the FMC system modification displays to the pilot the distance between the aircraft's present position and the alternate destination, an estimated time of arrival (ETA) at the alternate destination, and an estimate of the fuel remaining onboard the aircraft if the aircraft were to land at the alternate destination. The ETA and remaining fuel are calculated by estimating the flight path that the aircraft would have to take from the current position to the alternate airport. To minimize the computational time necessary to generate the trip information to each alternate destination, a rough estimation technique is used to calculate both the ETA and fuel remaining. As a result, the displayed trip information has generally less accuracy than would be normally be displayed by the flight management computer when estimating and displaying the time to and fuel remaining at the intended destination of the aircraft.

To select and implement a diversion to an alternate destination using the system disclosed in the '186 patent requires a significant amount of effort by the pilot. The flight management computer generates a series of screens on a control and display unit (CDU) which allow the pilot to compare the ETA and remaining fuel for a number of different alternate destinations. If a pilot were actually to divert to one of the alternate destinations, however, the routing information to that destination has to be programmed into the flight management computer by the pilot. Those skilled in the art will recognize that the programming procedure takes a significant amount of time and effort by the pilot when the pilot's attention may be more effectively used elsewhere. For example, in the preferred embodiment of the flight management computer disclosed in the '186 patent, the following steps must be followed to divert an aircraft to an alternate destination. First, the pilot must select a RTE LEGS page, and enter any alternate waypoints into the active flight plan currently stored in the computer. Second, the pilot must select a RTE page and enter the alternate destination into the active flight plan. Once the waypoints and destination have been stored in the flight management computer, any changes to the vertical profile of the airplane must be made by the pilot by accessing the CLB (climb), CRZ (cruise), or DES (descent) page. Finally, if the emergency is a result of a failed engine, the pilot must select a VNAV page and select engine-out performance for the aircraft. Once all changes have been made, the modified flight plan must then be executed. In the event of a diversion to an alternate destination, it will therefore be appreciated that during the critical initial stages of the emergency when the pilot is deciding the diversion destination and implementing the diversion, the pilot will have to concentrate on accurately inputting the diversion information into the flight management computer. This takes a significant amount of time, and distracts the pilot during a period when the pilot can be concentrating on responding to other aspects of the emergency. It will therefore be appreciated that there is a need for an alternate 20 destination planner that quickly allows a pilot to select an alternate destination and implement the aircraft's diversion to that alternate destination.

Another limitation in the alternate destination planner disclosed in the '186 patent is that the estimate of the ETA and remaining fuel provided by the flight management computer has limited accuracy due to the estimation procedure used to calculate the arrival data. In particular, in order to calculate the arrival data to each alternate destination in a minimum amount of time, the alternate destination planner of the '186 patent assumes a direct flight path to the alternate destination, a constant speed equal to the airplane's current speed, and certain environmental conditions such as the external temperature. Although normally the requisite amount of accuracy is provided to the pilot by an alternate destination planner using these assumptions, in extreme cases a more accurate estimate of the trip information may prove to be invaluable to a pilot. For example, when an engine fails in an extended-range twin-engine operation (ETOPS) environment, the pilot is expected to land at the nearest suitable airport. When making the decision on which suitable airport to divert to, the pilot's decision is ideally based on the most accurate information available. It will be appreciated that there therefore exists a need for an alternate destination planner for aircraft that provides a more reliable estimate of the ETA and remaining fuel when arriving at the alternate destination.

A further limitation of the alternate destination planner disclosed in the '186 patent is that it provides limited routing options between the current position and the selected alternate destination. In particular, the alternate destination planner assumes that a direct or missed approach course will be taken from the aircraft's current position to the alternate destination. Although a direct course is the most common routing that would occur when flying to an alternate destination, there are a number of additional routing options that are possible and desirable for a pilot to follow. It will therefore be appreciated that an alternate destination planner that allowed a pilot to select a number of different routing paths between the aircraft's current position and the alternate destination would allow the pilot greater flexibility in planning and when it became necessary to divert to the alternate destination.

The present invention is directed to an improved alternate destination planner within a flight management computer that reduces the time and effort required by a pilot to divert an aircraft to an alternate destination.

SUMMARY OF THE INVENTION

The present invention is a modification to an aircraft's flight management computer (FMC) system to incorporate an improved alternate destination planner in the FMC. The alternate destination planner disclosed herein provides a pilot with a list of alternate landing destinations based on a navigational database of available landing sites stored in the memory of the FMC, or based on a list of alternate destinations transmitted to the aircraft from a ground station. For each alternate destination, the alternate destination planner advises the pilot of an expected time of arrival (ETA) and an amount of fuel remaining upon arrival at the alternate destination. The displayed arrival data allows the pilot to make an informed decision about which alternate landing destination to choose in the event of an emergency requiring diversion from the intended destination.

In accordance with one aspect of the invention, the alternate destination planner automatically lists the alternate destinations according to the ETA at each of the destinations. In ordering the alternate destinations, the planner disclosed herein takes into account the user-modifiable parameters of aircraft altitude, aircraft speed, wind direction and speed, outside air temperature, and selected routing option. When a parameter is modified by the pilot, the estimates of the ETA and remaining fuel are automatically recalculated and redisplayed based on the specific parameter defined by the pilot. The alternate destination planner disclosed herein therefore provides the pilot with a highly accurate estimate of the arrival data corresponding to each alternate destination, from which the pilot can select the most appropriate flight path diversion during an emergency.

In accordance with another aspect of the invention, several different routing options are provided from the aircraft's current position to the alternate destinations. As provided in prior systems, the pilot may opt to fly directly from the current position to the alternate destination. The pilot is also provided, however, with the option of flying either an offset route or an overhead route from the present position. An offset route is a route that parallels the direct route to the alternate destination, but is offset to the left or right of the direct route by a desired number of nautical miles. An overhead route allows a pilot to continue along the original flight plan to a specified waypoint, and then to fly directly from the point overhead the waypoint to the selected alternate destination. The three routing options allow a pilot greater flexibility when diverting to the alternate destination.

In accordance with a further aspect of the invention, the selection and diversion of an aircraft to an alternate destination is automatically performed using a minimal amount of pilot input. In an emergency situation, the pilot merely has to press two keys to automatically select an alternate destination and reprogram the flight management computer with the flight plan to the selected destination. The pilot may also indicate during such a diversion when one of the aircraft's engines has failed. After receiving notification of the engine failure, the alternate destination planner automatically recomputes the ETA and remaining fuel for the alternate destination based on the limited performance of the aircraft.

In yet another aspect of the invention, data may be transmitted from a ground station to the alternate destination planner in order to provide accurate conditions for estimation of the ETA and remaining fuel for each alternate destination. An airline may also transmit data to the aircraft which provide a list of alternate destinations as well as a desired routing to those destinations. The capability of the alternate destination planner to receive and incorporate updated data into its calculations ensures that accurate diversion information can be continuously provided to the pilot.

In a still further aspect of the invention, the FMC generates a visual indication of the location of the alternate airports on a navigation display. The visual indication of the location of the alternate destinations with respect to the current aircraft position and the active flight plan route allows the pilot to quickly judge the distance and orientation to a number of different alternate airports. The display allows the pilot to more rapidly select the airport to divert to, minimizing the amount of time that the diversion takes when an emergency occurs.

It will be appreciated that the above features of the alternate destination planner allow a pilot to quickly and efficiently divert an aircraft to an alternate destination during an emergency situation. The improved visual identification of the location of the alternate destinations, as well as the more accurate estimation of the ETA and remaining fuel for each alternate destination improves the decision-making of the pilot. The capability or preprogramming the alternate destination planner with specific diversion parameters also allows the pilot and the airline a flexible means to tailor their diversion response to specific emergency situations. The alternate destination planner disclosed herein therefore allows a pilot to respond to emergency situations in an efficient and expeditious manner.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 5A and 5B are diagrams of representative flight profiles of an aircraft's flight plan from the aircraft's present position to an alternate destination;

FIGS. 6A and 6B are diagrams of a series of representative displays of the CDU wherein a pilot has depressed a "divert now" key implementing a diversion of the aircraft to an alternate destination;

FIGS. 7A, 7B and 7C are diagrams of a series of representative displays of the CDU wherein alternate destination data is uploaded to the alternate destination planner from a ground station.

DETAILED DESCRIPTION OF THE PREFERRED EMBODIMENT

Figure 1:
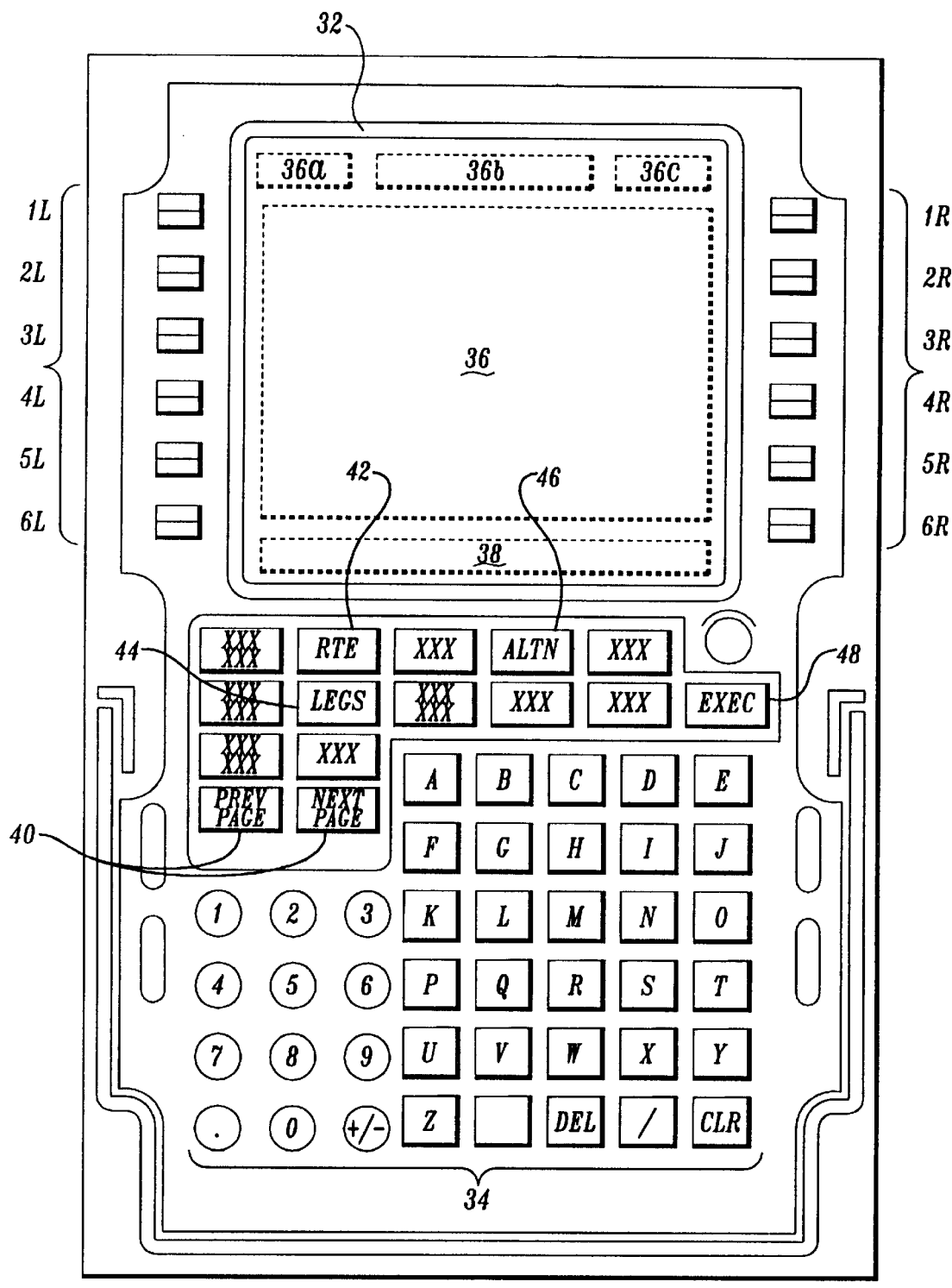
FIG. 1 is a pictorial diagram of the face of a representative control display unit (CDU) that is incorporated in an aircraft and used as an interface to the aircraft's flight management computer (FMC) system containing an alternate destination planner of the present invention.

FIG. 1 is a pictorial diagram of the face of a control and display unit (CDU) 30 that is typically used in commercial aircraft as an interface to a flight management computer system. One of the functions of an aircraft's flight management computer system is to perform navigation functions. The flight management computer typically stores a predetermined flight plan in memory, and tracks the current location of the aircraft along the flight plan from the originating airport to the destination airport. To accurately monitor the aircraft's location, the flight management computer receives data from a variety of aircraft subsystems and sensors that are well known in the aircraft art. Flight management computers and CDUs are well known in the aircraft art, so the following disclosure will not discuss the specific implementation of the flight management computer and CDU except as required to disclose the present invention. Further details of the cooperation of the flight management computer and the CDU may be found in U.S. Pat. No. 5,398,186, entitled "Alternate Destination Predictor for Aircraft" (expressly incorporated herein by reference).

The CDU acts as an interface to the flight management computer, and includes a display 32 and a keyboard 34 to allow the aircraft pilot to selectively view and manipulate navigation and other data. As shown in FIG. 1, the display 32 of the CDU 30 includes a central display area 36 in which data is displayed to the pilot. Above the central display area 36 is an area 36a in which a data status block is displayed, an area 36b in which a title of the screen is displayed, and an area 36c on which a page number of the screen is displayed. In order to identify and manipulate data on the screen, two sets of keys are disposed on either side of the central area of the display. A first set of keys, identified as 1L through 6L, is disposed on the left side of the display area 36, and a second set of keys, identified as 1R through 6R, is disposed on the right side. Each key corresponds to a display line which makes up the central display area 36 of the CDU. Pressing one of the keys on the left side or the right side of the display area typically implements a function that is displayed in the central area 36 immediately adjacent to the key that is depressed. A pilot may also enter data into the CDU using a set of alphanumeric keys 34. Data entered by the pilot is first displayed in a scratch pad area 38 located beneath the central display area 36. After entry into the scratch pad area, the pilot may move the data to a particular line of the central display area 36 by depressing one of the left keys, 1L through 6L, or right keys, IR through 6R The data contained in the scratch pad area is then typically moved to a position adjacent to the key that was depressed.

A plurality of function keys are also provided to directly implement predefined functions. A pair of keys 40 denoted next page and previous page allow the pilot to view the next screen of data or to review a previous screen of data displayed on the CDU 30. Two function keys are provided to access details of active or alternate route information. An RTE key 42 allows a pilot to view details about the active flight plan, and an LEGS key 44 allows the user to select and view data about a particular leg in the predefined or alternate flight plan. As will be described in further detail below, two function keys are of particular interest to the present invention. An ALTN key 46 is used to access an alternate destination summary page. A pilot pressing the ALTN key directly jumps to a family of ALTN data pages, the first page containing a list of alternate destinations surrounding the current position of the aircraft. An EXEC key 48 is also provided to confirm execution of certain user selected functions. In particular, when performing a diversion to an alternate destination, the EXEC key is used by the pilot to implement a change in course from the active flight plan.

I. Alternate Destination Planner Displays

The flight management computer is connected to the CDU to aid a pilot in navigating to an intended destination airport. If the aircraft is unable to land at the intended destination, for example because of inclement weather, engine failure, or a medical emergency onboard the aircraft, a pilot must select and divert to an alternate destination. The alternate destination may be a commercial airport, a military airport, or any other facility having sufficient area for the aircraft to land. To facilitate the pilot's selection and diversion to the alternate airport, according to the present invention the flight management computer is programmed with an alternate destination planner. More specifically, as will be better understood from the following description, the flight management computer system is modified to compute and display for a plurality of alternate destinations the estimated time of arrival (ETA) and remaining fuel if the aircraft were to fly from the current position to each of the destinations. Using the estimated flight data, the pilot may determine the appropriate alternate destination to which the aircraft should be diverted. The alternate destination planner disclosed herein facilitates the diversion by minimizing the amount of data manipulation required by the pilot, and by providing more accurate information on which the pilot may base their decision.

Figure 2A:
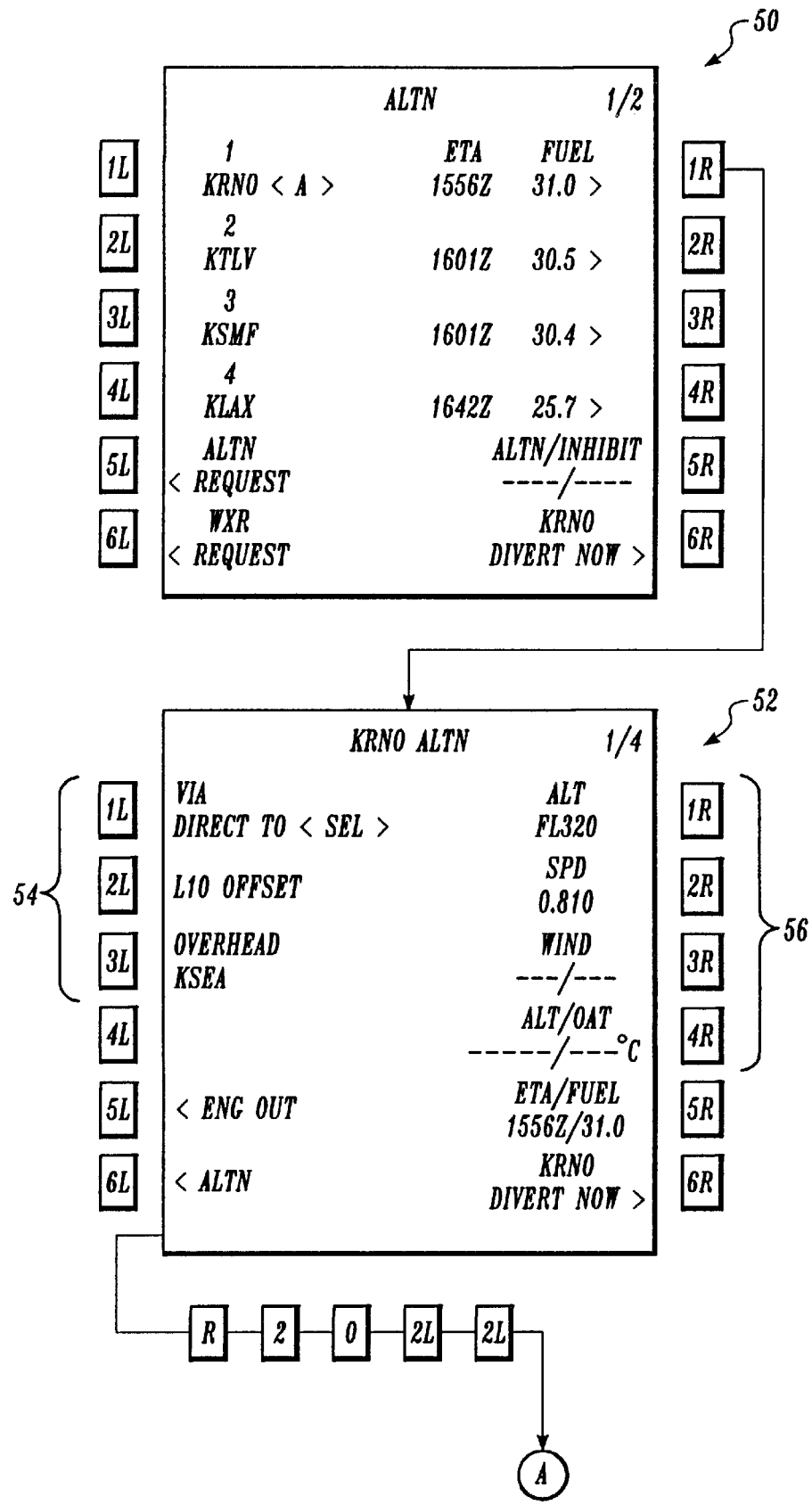
FIGS. 2A and 2B are diagrams of a series of representative displays of the CDU wherein the alternate destination planner of the present invention displays alternate destination data to allow a pilot to evaluate a set of alternate destination choices.
Figure 2B:
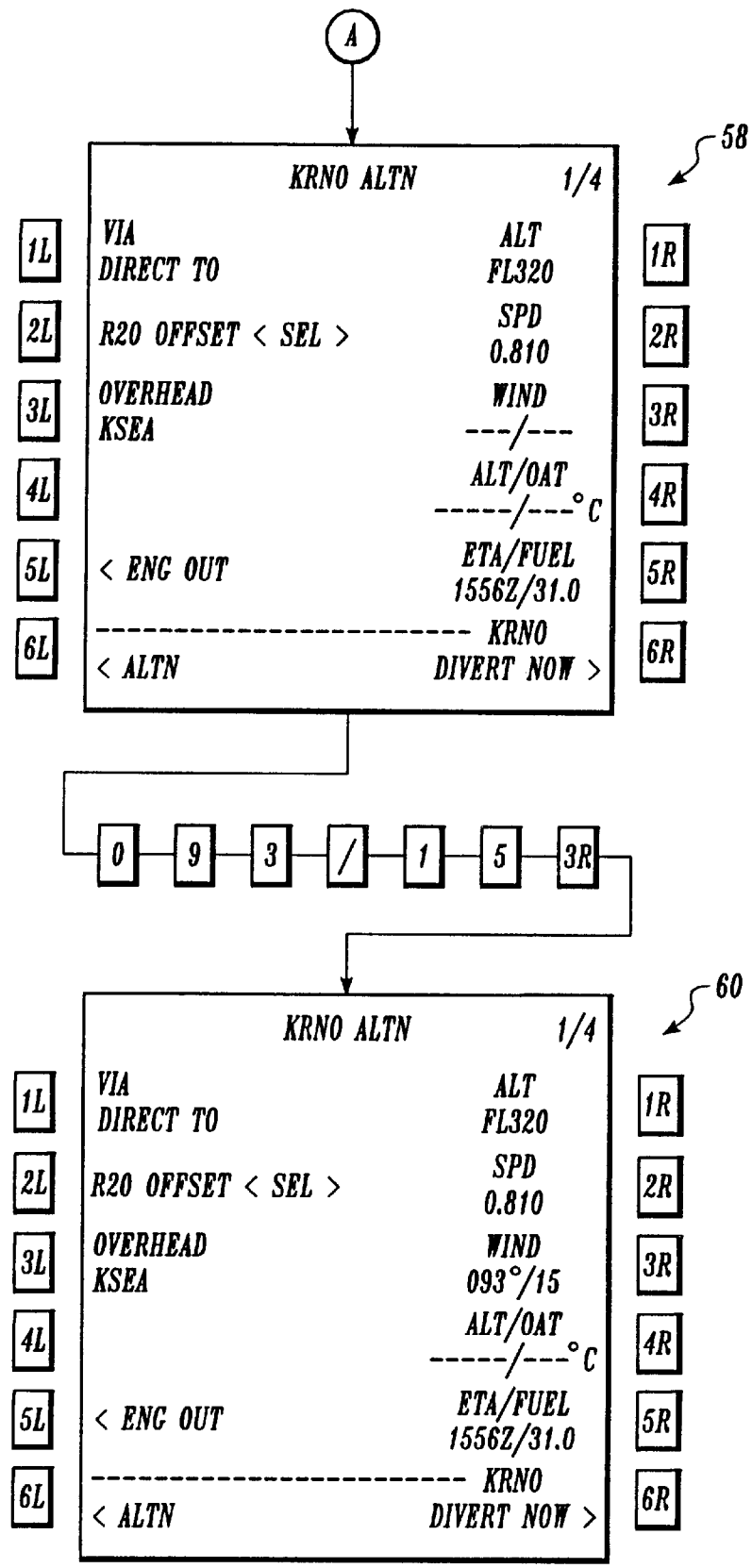

When a pilot is initially presented with an emergency situation, or when the pilot desires to preevaluate alternate destinations to which the aircraft might divert, the pilot presses ALTN key 46 on the CDU function key pad. Upon depressing the ALTN key, a data screen providing a summary of alternate destinations is automatically displayed on central area 36 of display 32. A series of screens representative of the data screens that may be accessed by the pilot on the CDU is depicted in FIGS. 2A and 2B. Upon pressing the ALTN key, a first screen 50 is displayed to the pilot. First screen 50 provides a summary of the nearest alternate destinations within range of the aircraft based on the current aircraft position and remaining fuel. The first four lines of display area 36 provide the closest four alternate destinations, automatically listed according to the time that it would take to fly to each particular alternate destination. The first entry on the list is therefore always the closest in time alternate destination. As shown on representative first screen 50, the closest in time alternate destinations are identified by their International Civil Aviation Organization (ICAO) identifiers, and include airports at KRNO (Reno, Nev.), KTLV (Las Vegas, Nev.), KSMF (Sacramento, Calif.), KLAX (Los Angeles, Calif.).

In addition to automatically identifying the nearest alternate destinations by time, the alternate destination planner also calculates and displays an estimated time of arrival ETA) at the alternate airport, and an amount of remaining fuel if the aircraft were to fly from the current position to the alternate airport via a selected routing option. The ETA and remaining fuel calculated by the alternate destination planner will hereinafter be referred to collectively as the arrival data. As shown on first screen 50, each line on the screen containing an alternate destination includes the alphanumeric identifier for the destination, the ETA, and the fuel remaining. The method of determining the four closest alternate destinations will be discussed in further detail below with respect to FIG. 3, and the method of calculating the arrival data will be discussed below with respect to FIGS. 4A–4G.

In addition to the automatic inclusion of alternate destinations in the summary list of alternate destinations, the pilot may also manually include or inhibit an alternate destination in the summary list. To manually include an alternate destination, the pilot keys the ICAO identifier in the scratch pad, and depresses one of the keys 1L through 4L to transfer the manually entered destination into the destination list. Once entered, the alternate destination planner will automatically calculate and display the arrival data for the manually entered destination. The alternate destination planner will also sort the summary list of alternate destinations so that the manually entered destination will appear in proper order of ETA. Once a destination is manually entered, it will remain in the summary list until deletion by the pilot. The other alternate destinations will change, however, as other alternate destinations are brought within closer ETA proximity to the position of the aircraft.

To manually inhibit the listing of an alternate destination in the summary list of alternate destinations, a pilot enters the ICAO identifier of the alternate destination and depresses key 5R, labeled ALTN INHIB, to transfer the manually entered destination into the inhibit list. As shown in first screen 50, adjacent key 5R are two fields that make up the inhibit list. Each field can contain an ICAO identifier. When an alternate destination is transferred to one of the fields, the alternate destination is inhibited from automatically appearing in the summary list of alternate destinations.

From first screen 50, the pilot may obtain more information about a particular alternate destination by depressing a corresponding key 1R through 4R. If, for example, the pilot were to press the 1R key to obtain more information about the alternate destination KRNO, a second screen 52 would be displayed on the CDU. The second screen 52 provides detailed information about the routing options for diverting from the active flight plan to the alternate destination. The second screen also provides a list of operating conditions used to calculate the arrival data for that particular alternate destination.

As shown on second screen 52, a list of three routing options 54 is provided to allow the pilot to specify the type of routing that will occur when the aircraft diverts from the active flight plan to a selected alternate destination. The first routing option, corresponding to key IL, is direct routing. When direct routing is selected, the aircraft is directly routed from the location of the aircraft when the diversion occurs to the selected alternate destination. The direct routing option is the default routing option automatically selected by the alternate destination planner, the selection of which is indicated by the characters <SEL> following the option on second screen 52. The second routing option is offset routing, corresponding to the 2L key. When offset routing is selected, at the diversion point the aircraft will fly a path parallel to the active flight plan, but offset to the left or to the right of the active flight plan by a specified number of nautical miles. The amount of offset selected by the pilot is indicated by an alphanumeric identifier "L" or "R," indicating "left" or "right," and a number representing the nautical miles of the offset. As shown on screen 52, the offset is currently set to L10, indicating a left offset of 10 nautical miles. In a preferred embodiment of the invention, the offset may extend up to 99 nautical miles. At a point in the offset continuation of the aircraft along the original flight plan, it is presumed that the aircraft will leave the offset path and fly a direct path to the alternate destination. The offset maneuver is therefore used to temporarily remove an aircraft from a heavy air traffic route before the direct diversion to the alternate destination occurs. The third routing option is overhead routing, corresponding to the 3L key. When overhead routing is selected, the aircraft will continue along the active flight plan to a selected waypoint. Upon reaching the selected waypoint, the aircraft then diverts from the active flight plan and flies directly to the alternate destination. The waypoint at which the aircraft diverts from the active flight plan is indicated by the ICAO identifier for the waypoint. As shown on second screen 52, the selected waypoint is KSEA, corresponding to the airport at Seattle, Wash. In a preferred embodiment of the invention, the default waypoint at which the aircraft leaves the active flight plan is the next waypoint along the active flight plan from the aircraft's current position. Alternatively, the pilot may specify the waypoint by entering in the alphanumeric code for the waypoint.

The pilot may select which of the three routing options 54 to use in the event of a diversion by pressing the appropriate key, 1L–3L, adjacent the routing option. As discussed above, when selecting offset or overhead routing, the pilot may also vary the desired offset or waypoint in the routing option. For example, as shown by the series of keystrokes in FIG. 2A, if the pilot desired to change the offset from left 10 nautical miles to right 20 nautical miles, the pilot would use the alphanumeric keypad to enter R-2-0- followed by pressing the 2L key twice. These keystrokes will initially display R20 in scratch pad area 38 of the CDU. Pressing the 2L key the first time moves the scratch pad data to a position adjacent the 2L key, changing the offset from L10 to R20. Pressing the 2L key the second time selects offset routing as the routing choice. As shown in screen 58 in FIG. 2B, the routing option has therefore been changed from direct routing to offset routing. Those skilled in the art will recognize that the alternate waypoint may similarly be changed by the entry of an appropriate alphanumeric keystroke sequence.

In a preferred embodiment of the invention, the selection of a routing option is a global selection that applies to all four of the alternate destinations displayed on first screen 50. That is, once a pilot has selected a routing option, a diversion to any of the four alternate destinations will take place along the selected routing option. If overhead routing is globally selected, however, each alternate destination may have a different waypoint specified at which the diversion from the active flight plan occurs.

In addition to providing a list of routing options, second screen 52 also displays a list of operating conditions 56 that are used by the alternate destination planner to calculate the ETA and fuel remaining at each of the alternate destinations. The first operating condition, corresponding to the 1R key, is the altitude of the aircraft to be used during diversion. The altitude of the aircraft may be entered by the pilot in either of two formats that are automatically recognized by the alternate destination planner. In an altitude format, the pilot enters the altitude of the aircraft in feet. For example, the pilot may enter "12000" to indicate that during diversion the aircraft should operate at 12,000 feet. In a second flight level format, the pilot may enter a flight level code indicative of the altitude. For example, the pilot may enter "FL250" to indicate that the aircraft should operate at 25,000 feet. To enter the appropriate altitude, the pilot keys the formatted altitude using the alphanumeric key pad of the CDU and then presses the 1R key to move the altitude level to a position on the screen. After entry of the altitude on one screen, the altitude of the aircraft is globally applied to all alternate destinations. That is, the calculation of the arrival data for all four alternate destinations on first screen 50 is based on the same altitude.

The second operating condition is the speed of the aircraft at which diversion is to occur. The speed of the aircraft may be entered by the pilot in one of several formats. In a first format, the pilot may enter a three-digit airspeed indicative of the aircraft's speed in knots. For example, the pilot may enter "300" to indicate a speed of 300 knots. The three-digit airspeed is typically only used to represent a low altitude diversion. In a second format, the pilot may enter a three-digit mach number, indicative of the aircraft's speed as a fraction of the speed of sound. In a preferred embodiment of the invention for subsonic aircraft, the mach number is always a fraction less than one. As shown in second screen 52, for example, the entered speed is mach 0.810. The mach number is typically entered by the pilot for a high altitude diversion. In a third format, the pilot may enter an alphanumeric speed code indicative of a certain type of performance. For example, in a preferred embodiment of the invention, the pilot may enter the code "LRC" to represent a long range cruise mode. In long range cruise mode, the alternate destination planner calculates the most fuel efficient speed for the aircraft to fly at given the current weight of the aircraft. It will be appreciated that several other alphanumeric speed codes may be provided, including codes for engine out operation, economy operation, and an airline defined default cruise mode. After entry of the speed on one screen, the speed of the aircraft is globally applied to all alternate destinations. That is, the calculation of the arrival data for all four alternate destinations on first screen 50 is based on the same speed.

In contrast to the speed and altitude which are globally defined for the alternate destinations, the remaining operating conditions are locally defined for each alternate destination. The third operating condition corresponds to the wind at the particular alternate destination. In a preferred embodiment, the pilot enters the value of the wind at the alternate destination by entering a three-digit value indicative of the direction of the wind in degrees, followed by a slash, followed by an up to three-digit value for the wind velocity measured in knots. For example, the pilot may enter a wind value of 093/15 to indicate a wind bearing 93° at a velocity of 15 knots. A different wind value may be entered by the pilot for each of the alternate destinations displayed on first screen 50.

The fourth operating condition is the outside air temperature associated with a particular altitude at an alternate destination. The format for the outside air temperature is the altitude, followed by a slash, followed by a temperature at the destination in plus or minus degrees Celsius. The altitude may be entered in either the altitude format or the flight level format discussed above with respect to the altitude condition. For example, a pilot may enter FL250/–25 to indicate a temperature of –25° C. at an altitude of 25,000 feet. As shown on second screen 52, when no values have been entered by the pilot for the wind or the outside air temperature, hyphens are inserted at the appropriate location to indicate the number of characters and appropriate format for each condition. A different outside air temperature value may be entered by the pilot for each of the alternate destinations displayed on first screen 50.

To enter or change any of the operating conditions, the pilot uses the alphanumeric keypad on the CDU to enter the updated condition using the appropriate format. The pilot then presses the appropriate key, 1R–4R, to move the value from the scratch pad to a position adjacent the selected key. For example, as shown by the keystrokes in FIG. 2B, a pilot may enter a wind bearing 93° at a velocity of 15 knots using the keystrokes 0-9-3-/-1-5. By pressing the 3L key, the wind data is then transferred from the scratch pad to a position adjacent the 3L key on fourth screen 60.

In addition to values entered by the pilot, typical operating conditions may be included in an airline modifiable information (AMI) file that is stored in the FMC and accessible to the alternate destination planner. The AMI file maintains a number of preselected values that the airline company has decided are suitable for describing the flight of the aircraft in the absence of a pilot preference. In particular, an airline defined aircraft speed and aircraft altitude are typically defined in the AMI file. When an individual alternate destination page is therefore initially accessed, the values stored in the AMI file will be displayed as the operating conditions until modified by the pilot.

Below the listing of the operating conditions, the arrival data is also repeated for the particular alternate destination represented on the screen. As shown on second screen 52, adjacent to key 5R is arrival data showing the estimated time of arrival at KRNO and the amount of fuel remaining upon landing. The arrival data displayed on the particular alternate destination screen corresponds to the data that is displayed on first screen 50. The arrival data is calculated by the alternate destination planner, and is not modifiable by the pilot.

II. Determining Least Time Alternate Destinations and Calculating Arrival Data

Figure 3:
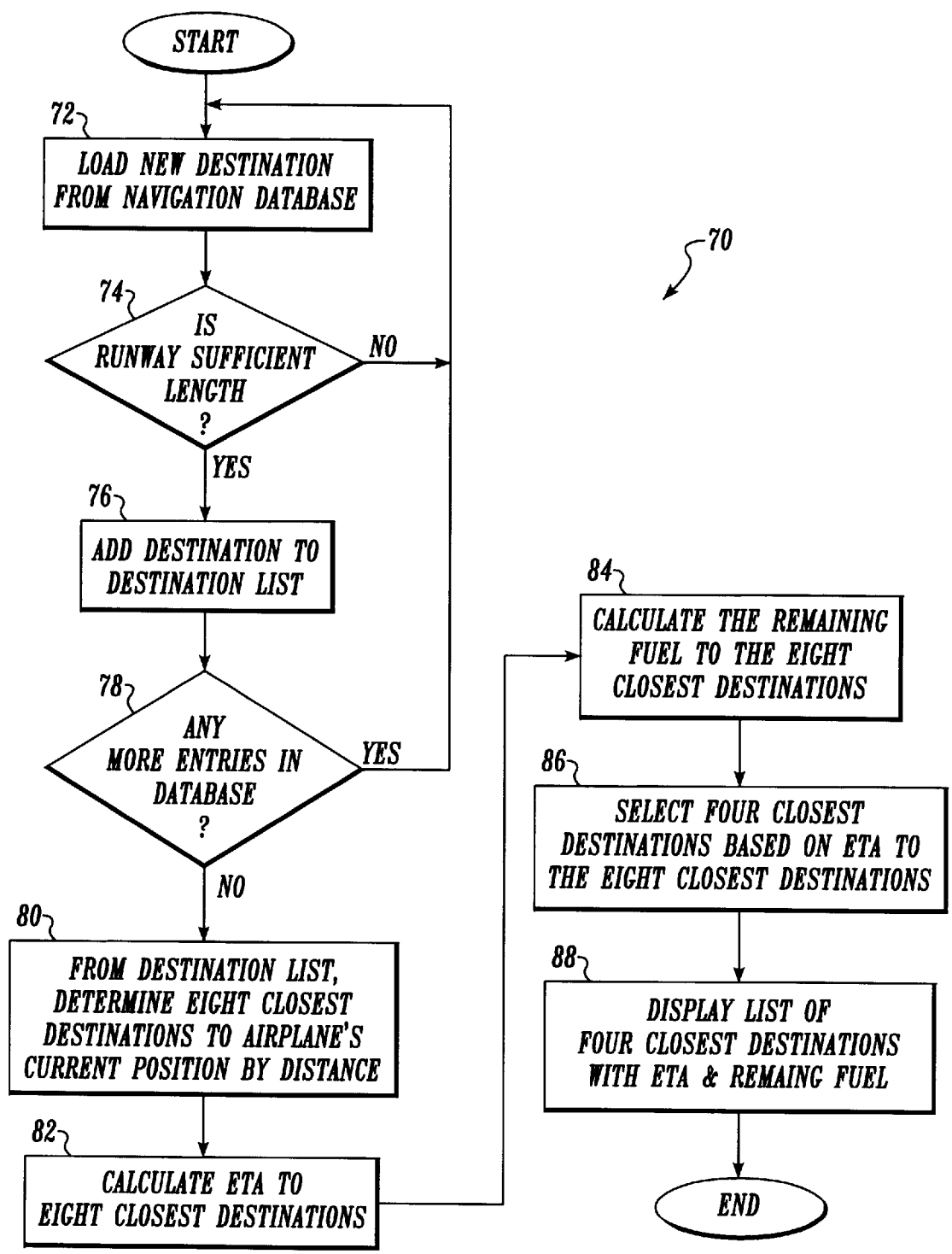
FIG. 3 is a flowchart of an exemplary routine for identifying the set of alternate destination choices from a database containing a plurality of alternate destinations.

Having described the data provided by the alternate destination planner to the pilot, the methods of determining the closest alternate destinations by time, the estimated time of arrival, and the remaining fuel will now be discussed. FIG. 3 is a flowchart of a main program 70 incorporated within the alternate destination planner that is used to identify according to flight time the four closest airports to the aircraft's current position. In addition to identifying the closest airport by time, the program calculates the ETA and remaining fuel to each alternate destination and displays the alternate destinations, ETAs and remaining fuel on the CDU.

Initially, the program enters a loop to search a navigation database contained within the flight management computer and identify suitable alternate destinations in the database. Those skilled in the art will recognize that modern flight management computers typically incorporate a database containing a list of all airports and other landing destinations around the world. Although the format may vary, the database typically contains a four-digit destination identifier, a set of coordinates representing the precise latitude and longitude of the destination, and a data field indicating the runway length at the particular destination. Additional data fields containing further information about the facilities at each of the destinations may be included in the navigation database, depending upon the size and complexity of the database incorporated in the flight management computer.

To search the navigation database, the main program initially loads a destination from the database at a block 72 and, at a decision block 74, examines the destination to determine if the runway is of sufficient length to land the aircraft containing the alternate destination planner. A minimum runway length for the particular aircraft is defined by the airline and included in the AMI file stored in the FMC. If the runway at the destination is not of sufficient length, the program returns to block 72 where a new destination is loaded and examined by the program. If the runway is of sufficient length, however, the main program proceeds to a block 76 where the destination is added to a destination list. At a decision block 78, the main program determines if there are any more entries in the navigation database. If the database contains additional entries, the main program returns to a block 72 to examine the next entry in the database. If the entire database has been searched, however, the main program proceeds to a block 80.

At block 80, the main program examines the suitable destinations selected from the navigation database to determine the eight closest destinations to the airplane's current position. A straight line distance between the airplane's current position and the latitude and longitude of the destination is calculated, and the resulting distances compared to select the eight closest destinations by distance. The calculation of the distance between two points identified by latitude and longitude coordinates is well known in the navigation art. It will be appreciated that an additional step may be incorporated in block 80, wherein a direct comparison is made with the latitude and longitude of the current aircraft position to quickly eliminate distant destinations without calculating a straight line distance.

Figure 4A:
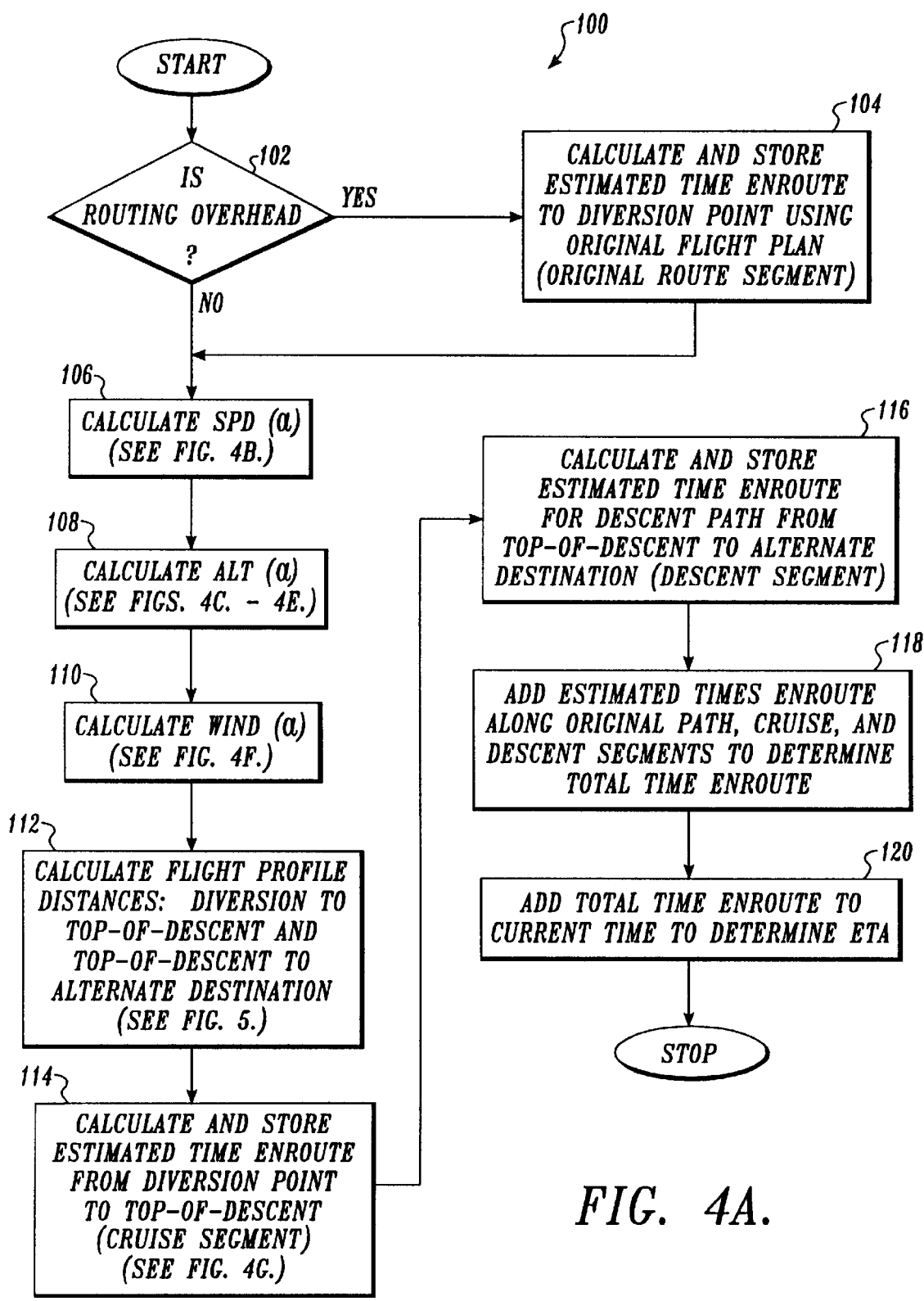
FIGS. 4A–4G are flowcharts of exemplary routines for computing an estimated time of arrival (ETA) from the aircraft's current position to an alternate destination taking into account aircraft and environmental conditions.

At a block 82, the main program calculates an ETA to the eight closest destinations. A flow chart of an ETA subroutine 100 for calculating the ETA to a given alternate destination is shown in FIG. 4A To estimate the ETA, the ETA subroutine divides the diversion path into two or three flight segments, depending upon the routing option that is selected. A diagram of two flight profiles showing the flight segments used by the alternate destination planner to calculate the ETA during diversion from an original flight plan to an alternate destination are shown in FIGS. 5A and 5B.

The flight profile shown in FIG. 5A represents the flight profile used by the alternate destination planner when the direct or offset routing options have been selected by the pilot. In the representative flight profile, the aircraft initially enters a cruise segment where it maintains a desired altitude and a desired speed. The cruise segment extends until the aircraft hits a top of descent point, after which the aircraft begins to descend to the alternate destination. The aircraft is presumed to descend along the following predefined descent path:

(a) From the top of descent point, the aircraft follows a linear path having a 3° glide slope until a point 1000 feet above the Federal Aviation Administration (FAA) defined speed transition altitude at the speed used during the cruise segment;

(b) From the end of segment (a), the aircraft follows a linear path having a 1.5° glide slope until the speed transition altitude at a scaled value of the speed used during the cruise segment;

(c) From the end of segment (b), the aircraft follows a linear path having a 3° glide slope to a point 1000 feet above the altitude of the airport at a speed 10 knots below the transition speed; and (d) From the end of segment (c), the aircraft follows a linear path having a 1.5° glide slope until touchdown at a speed of 170 knots.

The location of the descent point is therefore determined by calculating back from the location of the alternate destination until the cruise altitude of the aircraft is reached. Those skilled in the art will recognize that knowing the speed and path of the aircraft during the descent, the location of the alternate destination, and the initial cruising altitude of the aircraft allows the alternate destination planner to determine the point in the cruise segment at which the aircraft should begin to descend.

FIG. 5B shows a flight profile used by the alternate destination planner when overhead routing has been selected by the pilot. In FIG. 5B, the aircraft continues along the original flight plan until the desired diversion point is reached overhead a waypoint. The first segment of the flight is therefore identified as the original route segment. Following the original route segment of the flight, the aircraft assumes a flight profile identical to the profile used in direct or offset routing. That is, upon reaching the diversion point, the aircraft enters a cruise segment at a desired speed and a desired altitude. Upon entering the cruise segment, the aircraft will typically ascend or descend to a more efficient altitude from the altitude of the original flight segment. Following the cruise segment, the aircraft reaches a top of descent point where it begins to descend along a predefined descent path to the alternate destination. The length of the descent segment and the top of descent point is calculated in a similar manner to the direct and offset methods described above.

Returning to FIG. 4A, the ETA subroutine determines whether the overhead routing option has been selected by the pilot at a decision block 102. If overhead routing has been selected, at a block 104, the program calculates an estimated time enroute (ETE) along the original flight segment of the flight profile, corresponding to the continuation of the aircraft along the original flight plan. Those skilled in the art will recognize that the original flight plan contains sufficient information for the ETA subroutine to calculate the amount of time it will take for the aircraft to reach the waypoint at which a diversion is to occur. The ETA subroutine then stores the ETE for the original route segment.

If the pilot selected direct or offset routing, the ETA subroutine continues to a block 106 after decision block 102. Block 106 begins a portion of the ETA subroutine where the subroutine calculates the ETE for the cruise segment. The ETA subroutine initially calls three nested subroutines to calculate the speed of the aircraft to be used during the cruise segment, the altitude of the aircraft to be used during the cruise segment, and the average wind to be encountered over the cruise segment. At block 106 the ETA subroutine calls a subroutine to determine the speed of the aircraft to be used during the cruise segment, represented by a variable Spd(a).

Figure 4B:
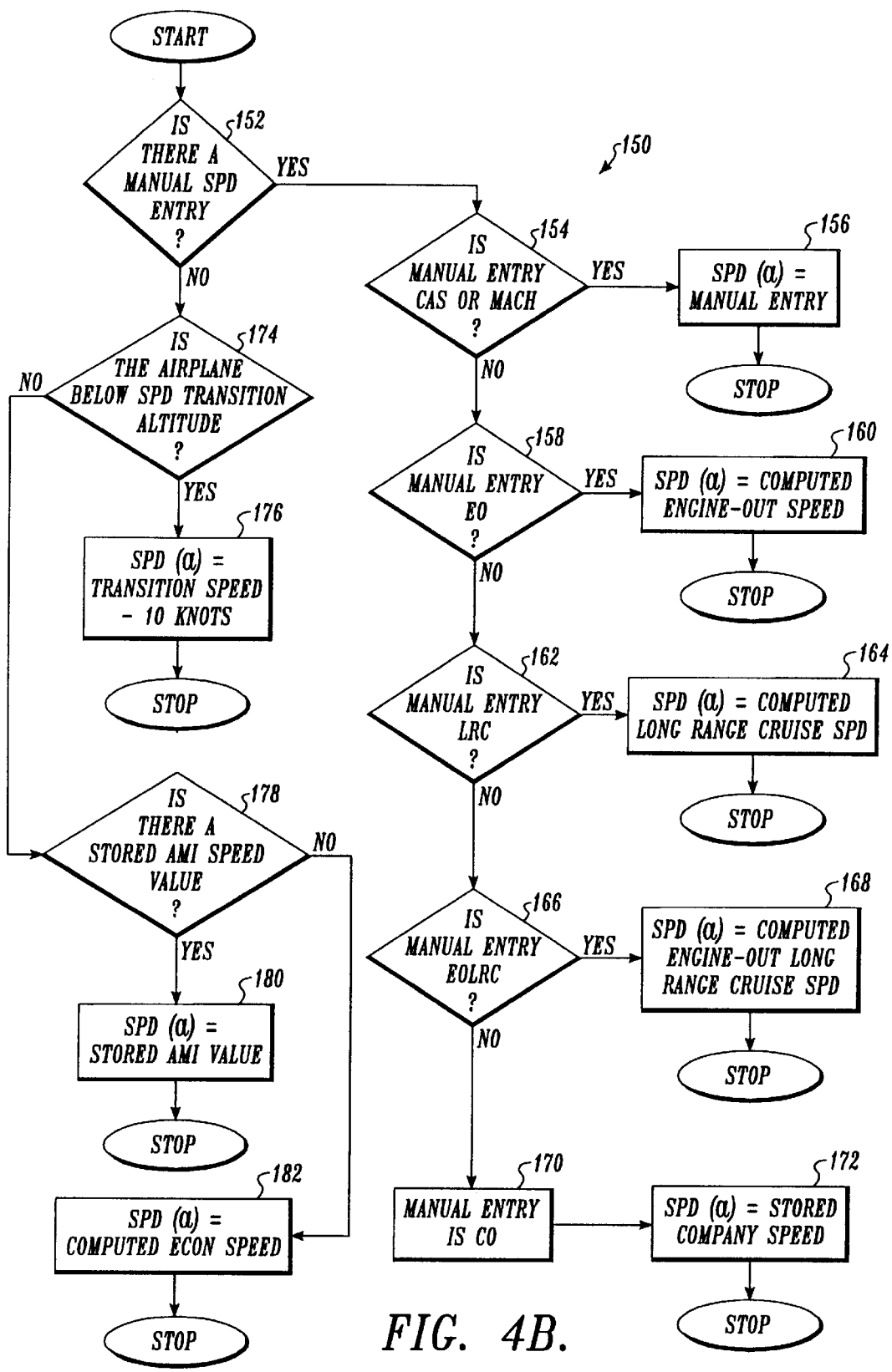

A speed subroutine 150 for determining the speed of the aircraft is shown in FIG. 4B.

When the speed subroutine is called, at a decision block 152 the routine determines whether there has been a manual speed entry by the pilot. If the pilot has manually entered a speed, the subroutine proceeds to a decision block 154. At decision block 154, the speed subroutine determines if the manual entry is in airspeed or mach format. As discussed above, the current speed may be entered by a pilot in knots or as a fraction of the speed of sound. If the manual entry is in airspeed or mach format, the subroutine proceeds to a block 156 where the variable Spd(a) is set equal to the manually entered value.

If at decision block 154 the speed subroutine determines that the manual entry is not in the airspeed or mach format, the program proceeds to a series of blocks 158 through 172 which determine the speed based on a number of preprogrammed alphanumeric codes representing a desired air speed. For example, at a decision block 158 the subroutine determines if the manual entry is equal to the characters "EO." If the manual entry is EO, the subroutine proceeds to a block 160 where it sets the variable Spd(a) equal to a computed engine out speed. Those skilled in the art will recognize that the computed engine out speed is less than the normal flight speed of the aircraft, and is determined by evaluating a number of different factors that are beyond the scope of the present disclosure. Similarly, blocks 162 and 164 represent a branch setting the variable Spd(a) equal to a computed long-range cruising speed if a pilot has manually entered the code "LRC." The long-range cruising speed is the minimum fuel-burn speed for the aircraft over a long-range flight, and is computed using an algorithm that is beyond the scope of this disclosure. Blocks 166 and 168 determine whether the pilot has entered the code for an engine out long-range cruising speed, and blocks 170 and 172 determine whether the pilot has entered the code for a company defined speed stored in the memory of the flight management computer. It will be appreciated that the number and alphanumeric codes represented in blocks 158 and 172 may be expanded or reduced to include additional or fewer codes indicative of a desired speed.

Returning to decision block 152, if the pilot has not entered a manual speed entry, the speed subroutine proceeds to a decision block 174 where the altitude of the aircraft is determined. It will be appreciated that in the United States, the FAA has mandated that under a certain altitude commercial aircraft must operate below a maximum speed. If the altitude of the aircraft indicates it is below the mandated speed transition level, at a block 176 the variable Spd(a) is set equal to the maximum speed below the transition altitude minus 10 knots. It will be appreciated that in other countries having different maximum speeds below a certain altitude, the variable Spd(a) will be set accordingly. It the aircraft is currently operating above the speed transition altitude, the speed subroutine proceeds to a decision block 178 where the subroutine determines whether there is a speed value stored in the AMI file. If there is a stored speed value in the AMI file, the subroutine proceeds to a block 180 where the variable Spd(a) is set equal to the stored AMI value.

If there is no speed value stored in the AMI file, the subroutine proceeds to a block 182 where the variable Spd(a) is set equal to a computed economy speed. The economy speed is determined based on a variety of environmental and aircraft conditions to be equal to the speed providing optimal fuel economy at a reasonable aircraft speed. The speed subroutine 150 therefore returns a value to the ETA subroutine for the variable Spd(a). It will be appreciated that the speed subroutine can be modified to include the measurement of the actual speed of the aircraft when the diversion is to occur. In a preferred embodiment of the invention, however, the speed must be either stored in the flight management computer, or entered by the pilot.

Figure 4C:
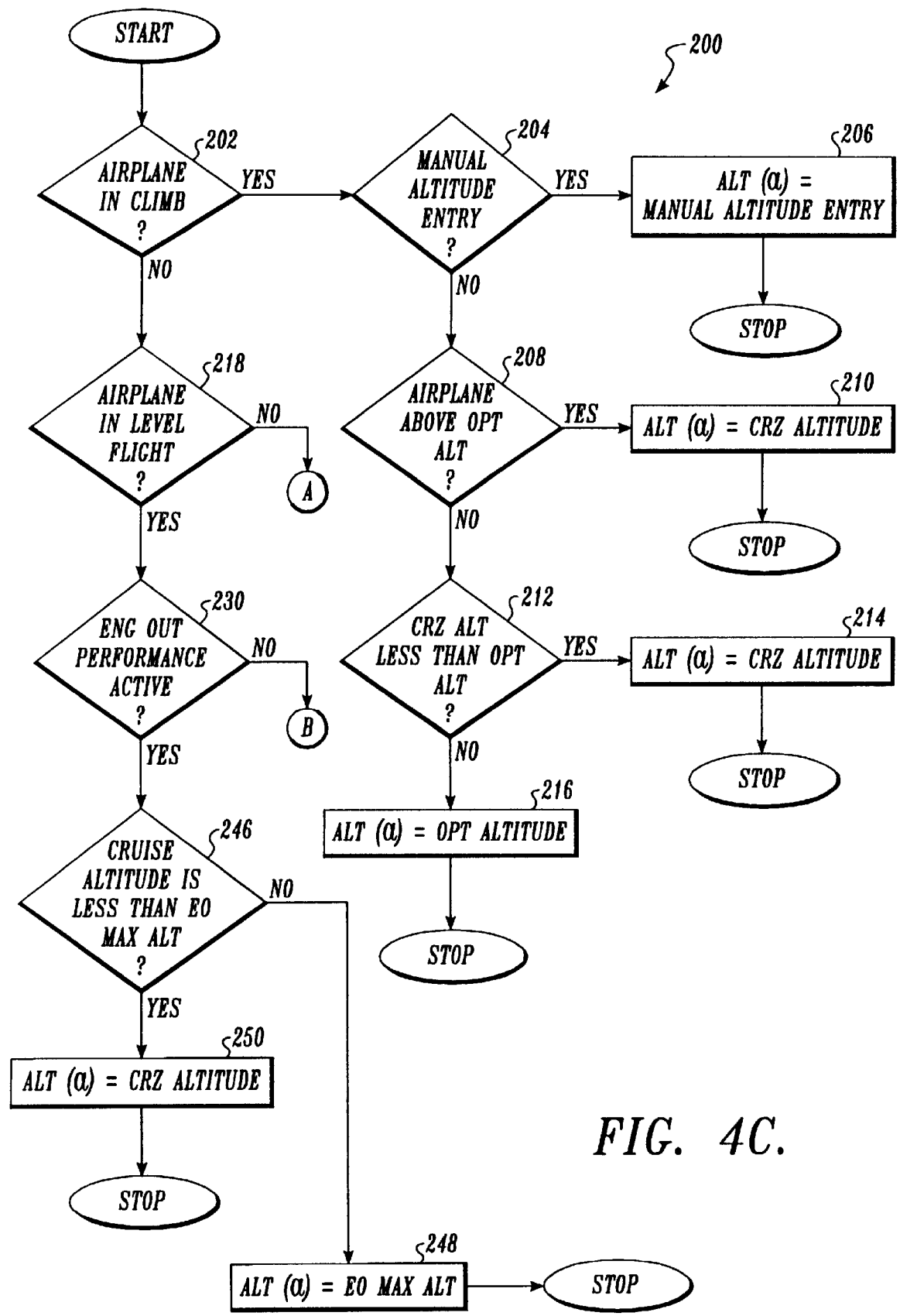
Figure 4D:
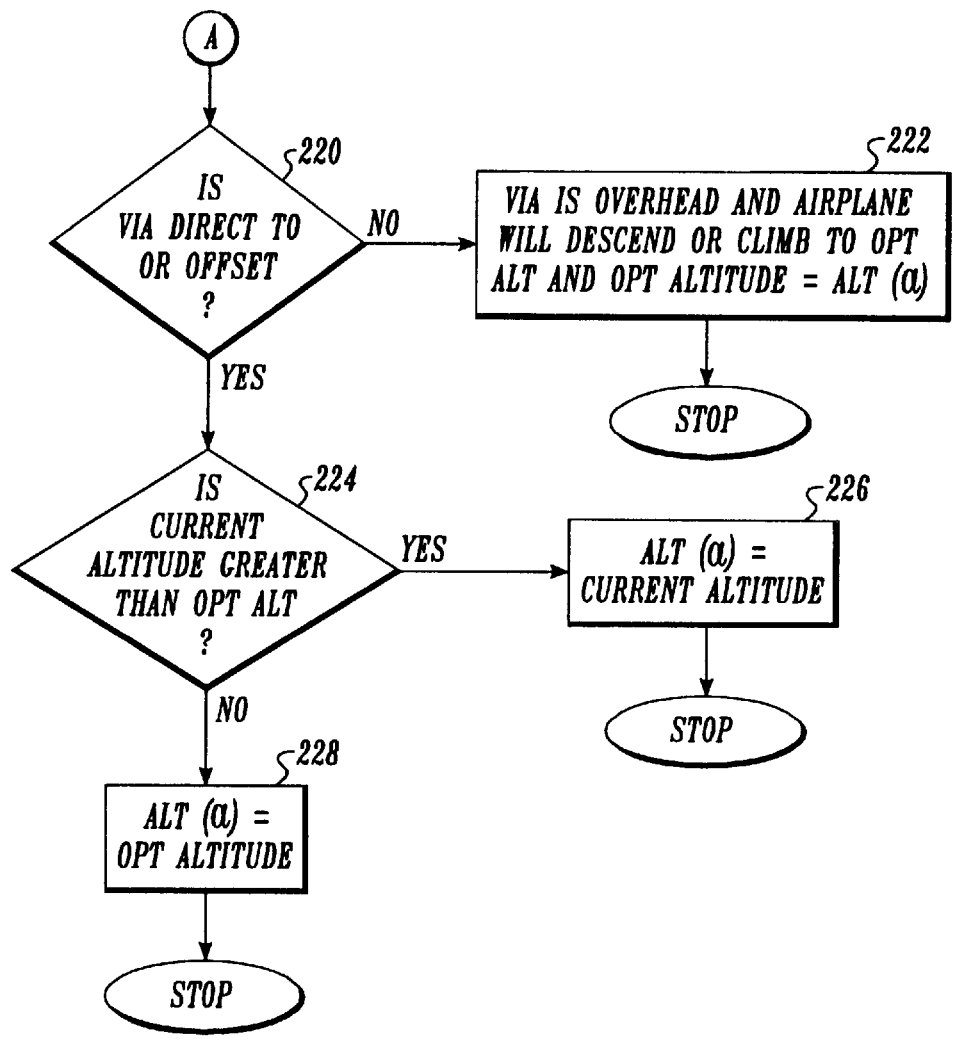
Figure 4E:
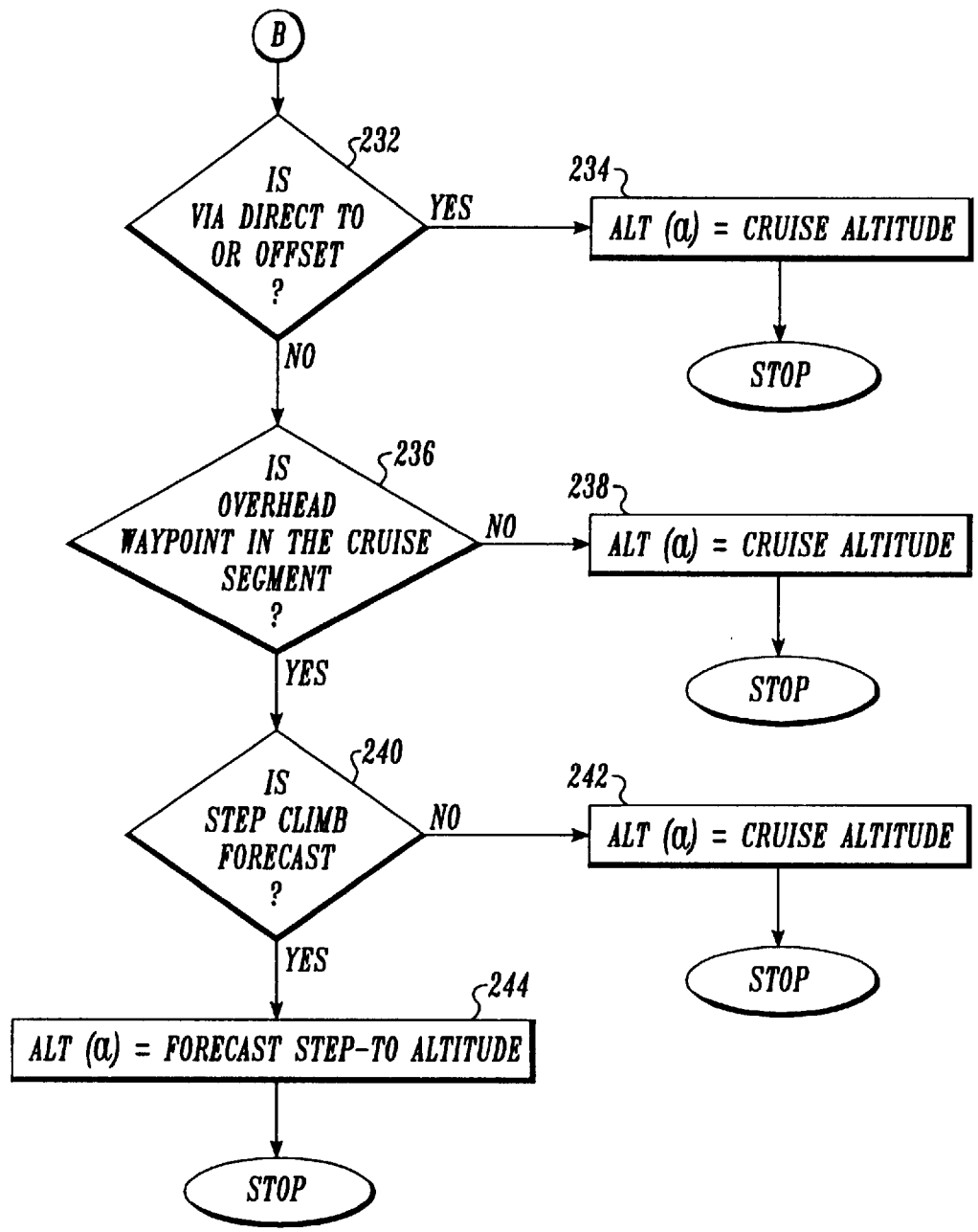

With reference to FIG. 4A, after estimating the speed during the cruise segment, the ETA subroutine proceeds to a block 108 where the altitude of the aircraft during the cruise segment is estimated. FIGS. 4C through 4E are flowcharts of an altitude subroutine 200 that estimates an altitude value Alt(a) at which the aircraft should operate during the cruise segment of the diversion. It will be appreciated that in the alternate destination planner described herein it is presumed that the aircraft will fly at a constant altitude from the point at which a diversion is made until the point at which the aircraft begins to descend to the alternate airport.

At a decision block 202 the altitude subroutine initially determines whether the aircraft is currently climbing. If the aircraft is climbing, the altitude subroutine proceeds to a decision block 204 where it is determined whether a manual altitude has been entered by the pilot. If the pilot has entered a manual altitude, at a block 206 the altitude subroutine sets the variable Alt(a) equal to the manual altitude entered by the pilot. As discussed above, the altitude entered by the pilot will be displayed using an altitude format or a flight level format. At block 206, the altitude subroutine therefore sets the variable Alt(a) equal to the desired altitude whether expressed in altitude format or flight level format.

If the airplane is in climb and the pilot has not entered a manual altitude, the subroutine proceeds to a decision block 208, where it is determined if the airplane is operating above an optimum altitude. It will be appreciated that the optimum altitude for an aircraft to operate varies with a number of conditions, but is based primarily on the gross weight of the aircraft including fuel. Generally, it is more efficient for a lighter aircraft to operate at a higher altitude than a heavier aircraft. If the airplane is above the optimum altitude, the subroutine proceeds to a block 210 where it sets the variable Alt(a) equal to the cruise altitude. The cruise altitude is the altitude cleared by air traffic control for operation of the aircraft, and is typically set by the pilot upon takeoff.

If the airplane is currently operating below the optimum altitude, the altitude subroutine proceeds to a decision block 212 where the subroutine compares the cruise altitude with the optimum altitude. If the cruise altitude is less than the optimum altitude, at a block 214 the variable Alt(a) is set equal to the cruise altitude. If the cruise altitude is greater than the optimum altitude, however, at a block 216 the variable Alt(a) is set equal to the optimum altitude.

Returning to decision block 202, if the aircraft is not currently climbing, the altitude subroutine 200 proceeds to a decision block 218 where it determines whether the airplane is in a level flight. If the aircraft is not in level flight, the altitude subroutine proceeds to a decision block 220 shown in FIG. 4D. Upon reaching decision block 220, it is presumed that the aircraft is in descent. At decision block 220, the altitude subroutine initially determines whether the aircraft will be routed via direct or offset routing. If the routing is not direct or offset (i.e., the routing is overhead), the altitude subroutine proceeds to a block 222 where the variable Alt(a) is set equal to the optimum altitude. In the event of a diversion, the aircraft will therefore descend or climb to the optimum altitude from the altitude at which the aircraft arrives at the waypoint for diversion.

If the routing will be via direct or offset routing, the altitude subroutine proceeds to a decision block 224. At decision block 224 the subroutine compares the current altitude with the optimum altitude to determine if the current altitude is greater than the optimum altitude. If the current altitude exceeds the optimum altitude, at a block 226 the variable Alt(a) is set equal to the current altitude. If the current altitude is, however, less than the optimum altitude, at a block 228 the subroutine sets the variable Alt(a) equal to the optimum altitude. During a diversion, the aircraft will therefore continue to operate at its current altitude unless the current altitude is less than the optimum altitude, in which case the aircraft is to climb to operate at the optimum altitude.

Returning to FIG. 4C, if the airplane is in level flight the altitude subroutine proceeds to a decision block 230 where it determines whether engine out performance has been selected by the pilot. If engine out performance has not been selected, the subroutine branches to a decision block 232 as shown in FIG. 4E. The branch starting with decision block 232 is therefore representative of the typical operating condition of an aircraft. That is, the airplane is in level flight and both engines are currently operating. At decision block 232, the altitude subroutine examines the routing option that the aircraft will take in the event of a diversion. If the routing is direct or offset, the altitude subroutine proceeds to a block 234 where the variable Alt(a) is set equal to the cruise altitude. If the routing is overhead, however, the subroutine proceeds to a decision block 236.

At decision block 236, the subroutine determines if the overhead waypoint where diversion from the active flight plan occurs is within the cruise segment of the flight profile. It will be appreciated that the overhead waypoint may come before or after the top of descent point on the flight profile, depending on the proximity of the waypoint to the alternate destination. If the overhead waypoint is after the top of descent point and not in the cruise segment, at a block 238 the variable Alt(a) is set equal to the cruise altitude. If the overhead waypoint is prior to the top of descent point and in the cruise segment, the altitude subroutine proceeds to a decision block 240. At block 240, the altitude subroutine forecasts whether there will be a step climb, or increase in altitude, during the original route segment. Those skilled in the art will recognize that at periodic intervals as an aircraft travels along a flight plan, the aircraft may increase its altitude to operate at a more efficient altitude. Operating at a higher altitude increases the efficiency as the weight of the aircraft decreases due to fuel consumption. If there is no step climb forecast during the original route segment, at a block 242 the altitude subroutine sets the variable Alt(a) equal to the cruise altitude. If there is a step climb forecast during the original route segment, however, at a block 244 the subroutine sets the variable Alt(a) equal to the altitude that the aircraft is expected to step to. The method of forecasting and calculating the magnitude of the step climb is well known in the art, and is not discussed in further detail herein.

With reference to FIG. 4C, if engine out performance is indicated at decision block 230 the altitude subroutine continues to a decision block 246. At decision block 246, the altitude subroutine compares the cruise altitude with an engine out maximum altitude. The engine out maximum altitude is the maximum altitude that the aircraft can operate at with one engine turned off. If the aircraft has been confirmed for a cruise altitude that is less than the engine out maximum altitude, at a block 250 the variable Alt(a) is set equal to the cruise altitude. If, however, the cruise altitude is greater than the engine out maximum altitude, at a block 248 the subroutine sets the variable Alt(a) equal to the engine out maximum altitude. An aircraft operating with engine out performance will therefore maintain its cruise altitude unless the cruise altitude is in excess of the engine out maximum altitude. If the cruise altitude is above the engine out maximum altitude, the aircraft will descend to that maximum altitude.

Figure 4F:
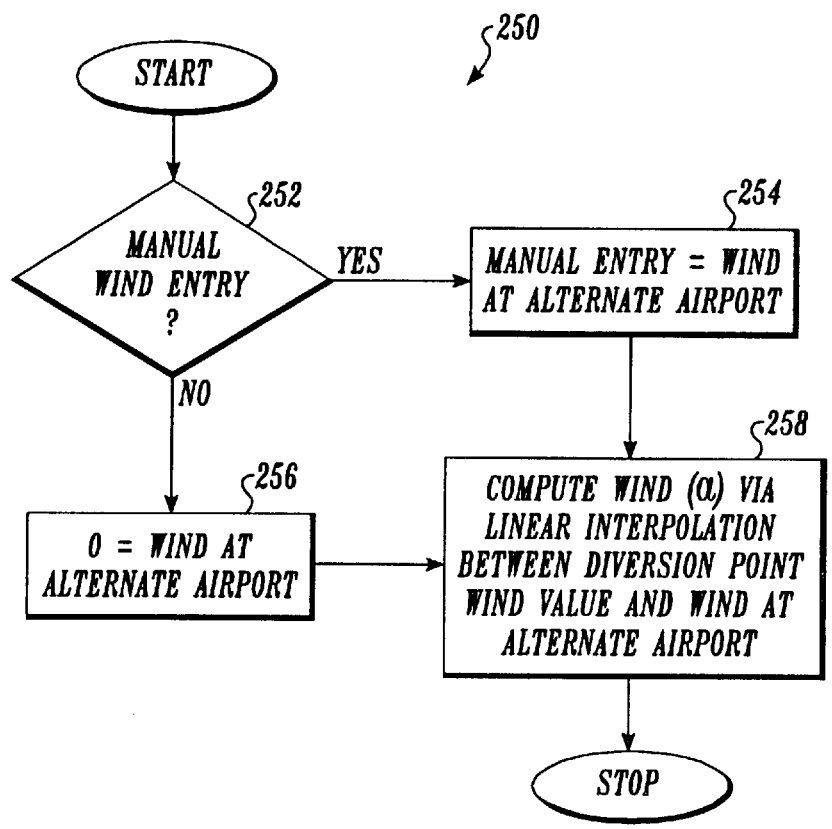

Returning to FIG. 4A, after determining the altitude to be used during the calculation of the ETE during the cruise segment, the ETA subroutine then proceeds to a block 110 where the wind during the cruise segment is estimated. FIG. 4F is a flow chart of a wind subroutine 250 that calculates an average wind to be encountered by the aircraft during the cruise segment of the diversion.

With reference to FIG. 4F, at a decision block 252 the wind subroutine initially determines whether the pilot has manually entered a value of the wind at the alternate destination. As discussed above, one of the operating conditions that the pilot may specify for each alternate destination is the wind direction and velocity. If the pilot has entered a value for the wind, at a block 254 the value of the wind at the alternate airport is set equal to the entered value. If the pilot has not entered a value for the wind, at a block 256 the wind value at the alternate destination is set equal to zero. At a block 258, the wind subroutine then uses the wind value at the alternate destination and a known wind at the diversion point to determine the average wind over the diversion route. If overhead routing is used, the wind at the diversion point is the wind at the waypoint where diversion to the alternate destination occurs. For direct or offset routing, the wind at the diversion point is presumed to be the current wind. For estimation purposes, the wind is also assumed to linearly change in direction and velocity from the wind measured at the diversion point to the wind measured at the alternate destination. The average wind is therefore the value of the wind at a point halfway along a linear interpolation between the wind at the diversion point and the wind at the alternate destination. After the wind subroutine calculates the average wind, the wind value is stored in a variable Wind(a).

With reference to FIG. 4A, after estimating the speed, altitude, and wind during the cruise segment of the diversion, the ETA subroutine proceeds to a block 112 where the length in nautical miles of each segment in the diversion plan to the alternate destination are calculated and stored. The length of the original route segment is determined from the original flight plan data. As was discussed above with respect to FIG. 5, the length of the cruise segment is dependent upon the location of the top of descent point. At block 112, the ETA subroutine therefore initially calculates the distance between the diversion point and the alternate destination. In a preferred embodiment, the subroutine then interpolates from an altitude of 1000 feet above the airport back to the estimated altitude of the aircraft during the cruise segment using the predefined descent path. The altitude where the descent path intersects the cruise segment is determined, thereby fixing both the length of the cruise segment and the length of the descent segment. The length of the cruise segment, descent segment, and, if applicable, original route segment are then stored by the ETA subroutine.

Figure 4G:
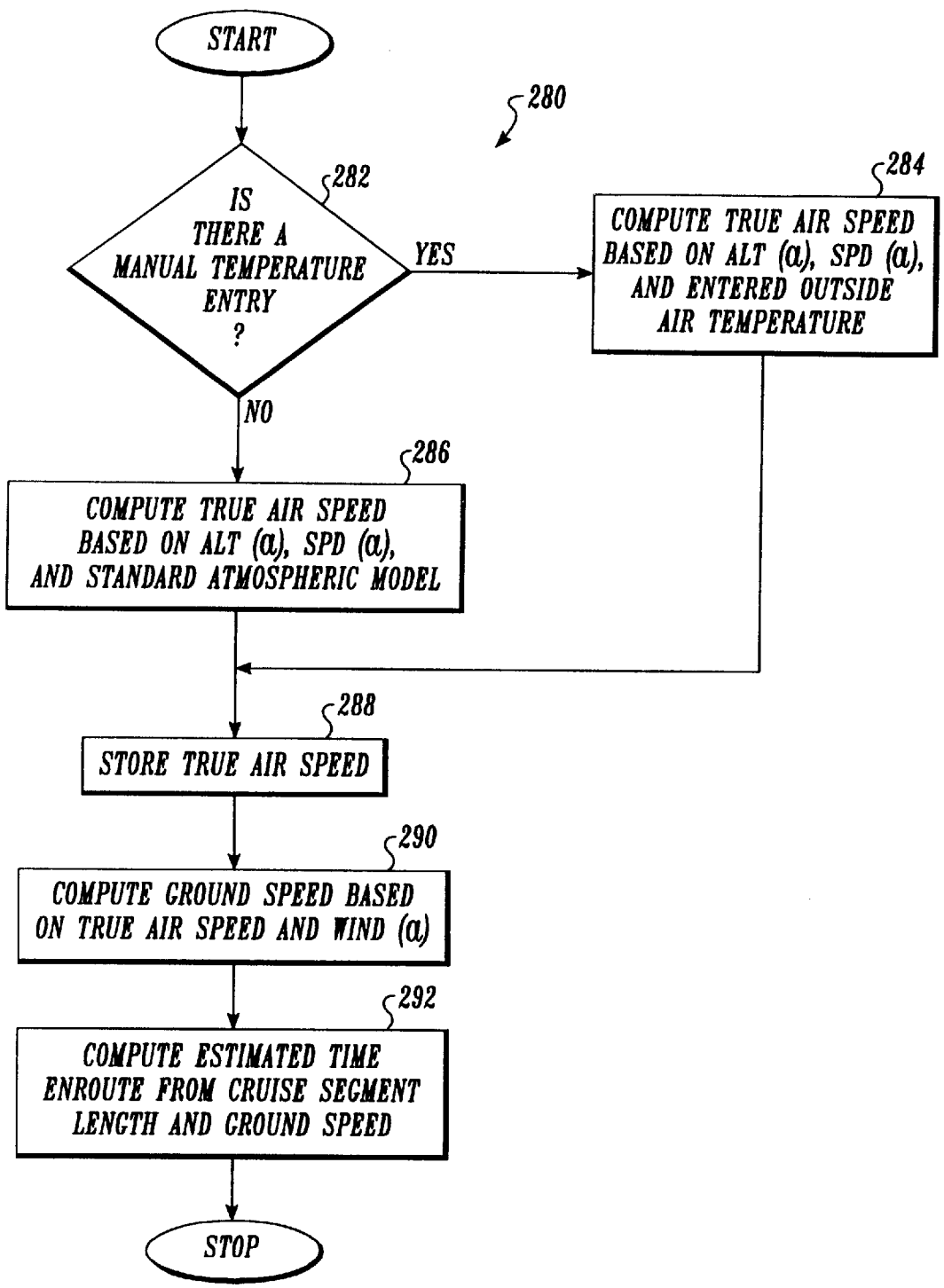

The ETA subroutine continues to a block 114 where the subroutine calculates the ETE during the cruise segment of the diversion, based on the stored values of Spd(a), Alt(a), and Wind(a). A flow chart of an ETE subroutine 280 for calculating the estimated time enroute for the cruise segment is shown in FIG. 4G.

At a decision block 282, the ETE subroutine initially determines whether the pilot has made a manual temperature entry in the alternate destination planner. As was discussed above, the pilot may enter the temperature at a certain altitude for each of the alternate destinations. If the pilot has entered a temperature, the ETE subroutine proceeds to a block 284 where the true air speed of the aircraft is computed based on the altitude Alt(a), speed Spd(a), and manually entered outside air temperature. The relationship of these factors to the true air speed of the aircraft is well known in the art, and is not discussed in additional detail herein. If the pilot did not enter a temperature for the alternate destination, at a block 286 the ETE subroutine computes the true air speed based on the altitude Alt(a), speed Spd(a), and a standard atmospheric model. After computing the true airspeed of the aircraft, the airspeed is stored at a block 288.

At a block 290, the ETE subroutine computes the actual ground speed of the aircraft based on the stored value of the true airspeed of the aircraft and the average wind Wind(a). At a block 292, the ETE subroutine then computes and stores the ETE of the aircraft along the cruise segment based on the length of the segment and the ground speed.

With reference to FIG. 4A, after calculating the ETE of the cruise segment at a block 114, the ETA subroutine calculates the ETE for the descent segment at a block 116. As discussed above, the estimation technique disclosed herein uses an predefined descent path having a linear slope and predefined speeds. Those skilled in the art will recognize that it is a straightforward matter to calculate the ETE of the descent path knowing the initial altitude of the aircraft, the speed of the aircraft, and the length of the descent segment. In a preferred embodiment of the alternate destination planner, the wind is assumed to be zero and the temperature nominal during the descent segment. After calculating the ETE for the descent segment, the ETE value is stored by the ETA subroutine.

At a block 118, the ETA subroutine adds the ETEs for each of the segments of the diversion flight plan to arrive at a total time enroute. If overhead routing is selected, the ETEs for the original route segment, cruise segment, and descent segment are added. If direct or offset routing is selected, the ETEs for the cruise segment and descent segment are added. At a block 120, the total time enroute is added to the current time maintained in the flight management computer to determine an ETA at the alternate destination. The ETA for the alternate destination is stored and the ETA subroutine returns to the main program.

Returning to the flow chart of the main program in FIG. 3 at block 82 ETA subroutine 100 is called eight times to calculate an ETA for each of the eight closest destinations. At a block 84, the main program calculates the remaining fuel at each of the eight closest alternate destinations. It will be appreciated that there are several techniques known in the art for calculating an aircraft's fuel consumption given the aircraft's operating altitude and speed, as well as the outside air temperature and wind. Since the length of each segment of the diversion path is known, the amount of fuel remaining at the end of each segment may be readily determined. At a block 86, the main program compares the ETA to the eight closest destinations and selects four destinations that have the lowest ETA. The alternate destination planner therefore identifies those alternate destinations that are the closest based on time, rather than distance.

At a block 88, the main program displays the list of the four closest destinations with the ETA and remaining fuel on the CDU. As shown in representative first screen 50 in FIG. 2A, the alternate destinations are ordered according to the ETA, with the closest alternate destination listed first. In a preferred embodiment of the alternate destination planner, absent any information input by the pilot or flight plan changes the list of alternate destinations and arrival data are updated every five minutes. The period between updates may be extended or reduced, however, depending upon the performance of the aircraft and the importance of maintaining timely information on the display. If the pilot changes the operating conditions or routing options, the displayed data is immediately recalculated. It will be appreciated that the method disclosed herein for estimating the arrival data for each alternate destination provides greater accuracy because it takes into account the aircraft altitude, the aircraft speed, the outside air temperature, the wind, and the selected routing to the alternate destination. Moreover, each of the factors may be modified by the pilot to more accurately reflect the current conditions. The pilot may therefore rely on the arrival data with a higher degree of confidence than prior alternate destination planners.

III. Alternate Destination Planner Operation

Once the CDU displays a list of alternate destinations, ETA, and remaining fuel, the pilot may select the alternate destination to which the aircraft is to divert. As shown in FIG. 2A, to increase the response time of the pilot the closest alternate destination by time is automatically preselected for diversion. The preselection is indicated on first screen 50 by a "<A>" following the four character identifier of the first alternate destination Alternatively, if the pilot elects to divert to one of the other alternate destinations listed, the pilot may select the alternate destination by pressing the appropriate key, 1L to 4L, next to the alternate destination. With reference to FIGS. 6A and 6B, a series of representative data screens that may be accessed by the pilot on the CDU are provided. The manual selection of the third alternate selection on representative screen 300 FIG. 6A was performed by pressing key 3L. A manual selection of a different alternate destination is indicated by a "<SEL >" following the identifier of the destination.

At any point in the process of selecting an alternate destination, editing the routing options, or editing the operating conditions, the pilot may immediately divert to the automatically- or manually-selected alternate destination by pressing key 6R. As shown on screen 300, key 6R is labeled with the text "DIVERT NOW" under the identifier of the airport that is currently selected for diversion. Pushing the divert now key 6R causes the text next to key 6R to change to "SELECTED" as shown in a representative screen 302. Additionally, the word "MOD" appears in the screen title to indicate that a flight plan modification has been selected. Pressing the divert now key causes a route modification to be loaded into the flight management computer. To implement the change in flight plan to the alternate destination, the pilot must press the EXEC function key 48. Pressing the EXEC key loads the alternate destination into the flight management computer, and starts the aircraft on the desired diversion if lateral navigation (LNAV) and autopilot are engaged. It will be appreciated that the minimal amount of time and keyed entry required by the pilot to implement a diversion improves the response time of the pilot in an emergency requiring a diversion.

If a pilot would like to cancel the diversion prior to pressing the EXEC key, the pilot may do so by selecting the alternate destination page showing the routing and operating conditions. As shown by a representative screen 304 in FIG. 6B, after pressing the divert now key, an "ERASE" option is added on the individual alternate destination page next to key 6L. Pressing the erase key clears the flight plan modification and associated information and returns the page to the previous unmodified state. The pilot may also modify the diversion to incorporate engine out performance. Provided to the pilot on screen 304 is an "ENG OUT" option adjacent key 5L. Pressing the engine out key causes the alternate destination planner to recalculate the arrival data for all of the alternate destinations based on the reduced performance available when the aircraft is only operating on a single engine. In particular, a new cruise altitude is determined if the current cruise altitude is above the engine out ceiling, and a new engine out speed is loaded for the reduced maximum speed of the aircraft. It will be appreciated that the preferred embodiment of the invention was adapted for use in the two-engine Boeing 777. An alternate destination planner incorporated in other aircraft having more than two engines would require a modification to the manner in which the engine out performance was selected.

A representative screen 306 is provided in FIG. 6B to further show the effect of implementing a diversion by pressing the EXEC key. Screen 306 was accessed on the CDU by depressing the LEGS key 44. Those skilled in the art will recognize that when the modification to the flight plan is executed, the active flight plan is discarded and the alternate destination is loaded as the current destination. As shown on screen 306, the alternate destination is automatically loaded as the first leg in the new flight plan. Additional data regarding the newly loaded flight plan may be accessed using techniques known to those skilled in using a CDU and flight management computer.

Figure 7C:
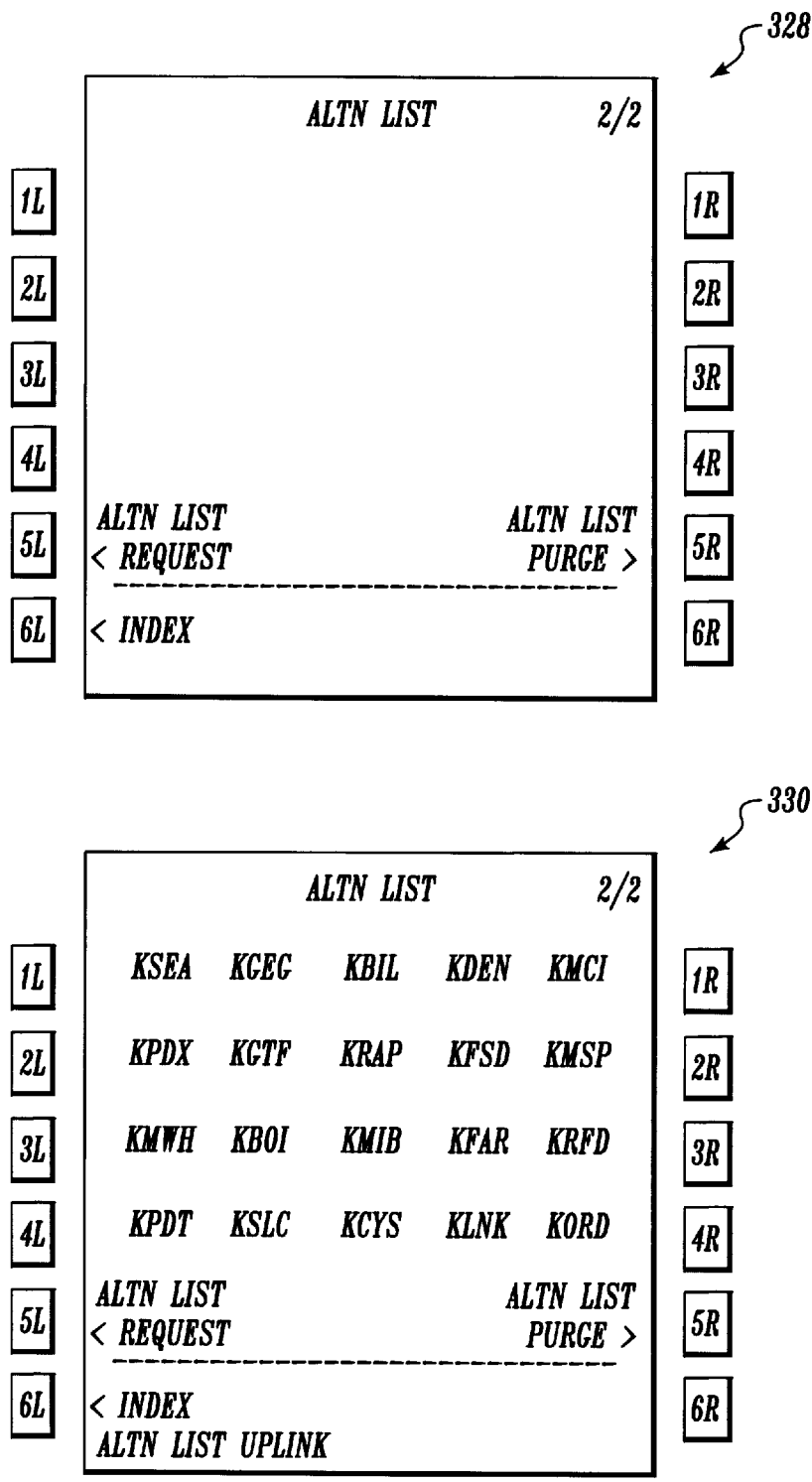

The alternate destination planner of the present invention also includes the capability of loading alternate destination data that is transmitted via air-ground data link from a ground station to the aircraft during flight. FIGS. 7A, 7B, and 7C show a series of representative data screens that may be accessed by the pilot on the CDU in order to request and receive ground station data. To request data about routing options and operating conditions for the four alternate destinations displayed on the alternate destination summary page (see screen 300 of FIG. 6A), a pilot presses key 5L, labeled as "ALTN REQUEST." Pressing the 5L key transmits a request from the aircraft to the ground station for updated information about each of the four alternate destinations displayed on the summary page. As shown in representative first screen 320 in FIG. 7A, after depressing the key the text adjacent the key changes to "REQUESTING," indicating that the downlink request has been transmitted. As shown in a second screen 322, the text changes to "REQUEST SENT" upon receipt from the ground station of an acknowledgment of the request. The coding and transmission of information between an aircraft and a ground station is well known in the art.

In a preferred embodiment of the alternate destination planner, the ground station may transmit to the aircraft a new list of up to four alternates along with a priority of the alternates. For each alternate, the ground station may transmit a value of the wind, outside air temperature, and overhead diversion waypoint. Additionally, a single diversion speed, altitude, and offset distance for all alternates may be uplinked from the ground station. Upon receipt of the requested information from the ground station, the alternate destination summary page is updated as shown in a representative third screen 324 in FIG. 7B. The numbers above each of the alternate destination identifiers indicate the priority of the alternate destinations as selected by the transmitting ground station. The pilot has the option of receiving the entirety of the uplinked data by pressing key 6R, or rejecting the entirety of the uplinked data by pressing key 6L. As shown in representative fourth screen 326, the pilot may view the individual alternate destination data before deciding whether to accept or reject the uplinked data. It will be appreciated that until the pilot accepts or rejects the uplinked data, the pilot may not divert the aircraft to an alternate destination. During the uplink accept/reject period, the DIVERT NOW alternative is removed from both the summary alternate destination page and the individual alternate destination page.

In a preferred embodiment of the alternate destination planner, the pilot also has the capability to request and receive via data link an alternate destination list that is used in place of the navigation database contained in the flight management computer. To load an alternate destination list, from the alternate destination summary page the pilot initially presses either the previous page or next page function keys 40 to arrive at an alternate list page as shown in a representative fifth screen 328 in FIG. 7C. To request an alternate destination list, a pilot presses key 5L, labeled as "ALTN LIST REQUEST." When the list is received from the ground station, the alternate list is displayed on the screen as shown in a representative sixth screen 330. In a preferred embodiment of the invention, an airline may uplink a list of up to twenty alternate airports from the ground station.

The received alternate destination list is automatically used by the alternate destination planner in place of the navigation database. That is, the alternate destination planner selects the four closest alternate destinations for display on the alternate destination summary page exclusively from the uplinked list. If the pilot desires to return to selecting the alternate destinations from the navigation database, the pilot may purge the uplinked list by pressing key 5R, labeled "ALTN LIST PURGE."

Figure 8:
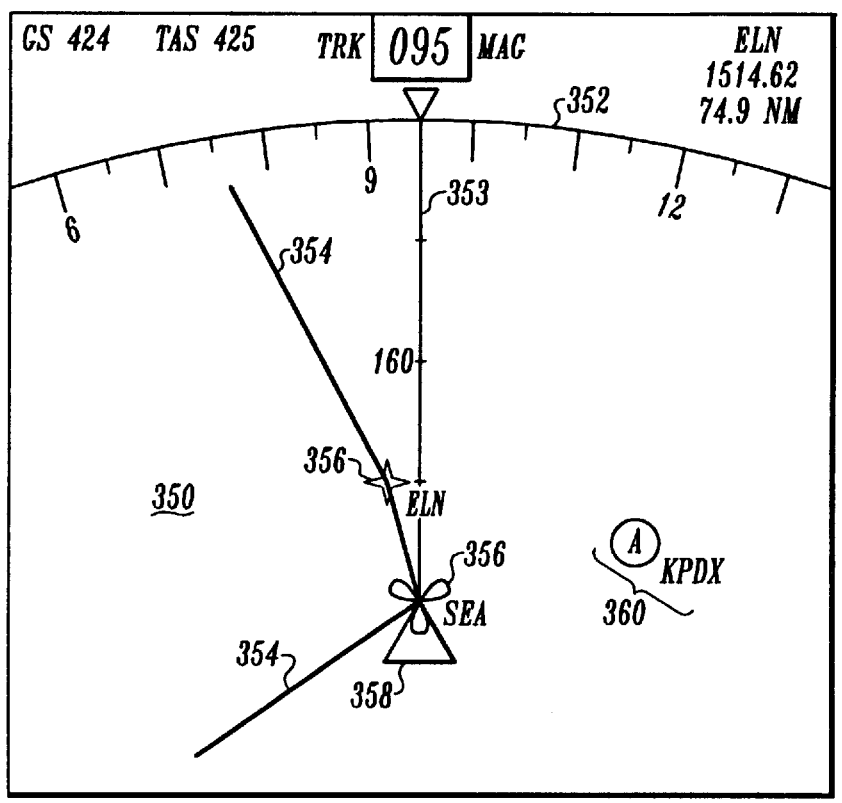
FIG. 8 is a pictorial diagram of a representative screen of a navigation display that is coupled to the alternate destination planner, the screen showing an active flight plan for an aircraft and providing a visual indication of nearby alternate destinations.

In accordance with another aspect of the alternate destination planner disclosed herein, in addition to providing a text listing of the alternate destinations available for diversion, the alternate destination planner also provides a graphical display of the location of the alternate destinations with respect to the current flight plan. FIG. 8 is a pictorial diagram of a representative screen of a navigation display 350 that is coupled to the alternate destination planner through the flight management computer. As those skilled in the art will appreciate, the depicted screen of the navigation display includes an aircraft icon 358 indicating the position and orientation of the aircraft containing the display and a rotating compass scale 352 from which the current heading of the aircraft can be ascertained. A distance scale 353 is also provided to allow a pilot to judge the distances to locations represented on the navigation screen. It will be appreciated that other screens may be generated on the typical navigation display other than the one shown in FIG. 8.

Superimposed over the compass scale, distance scale, and aircraft icon is a line 354 indicative of a flight plan of the aircraft. Line 354 is of a distinguishing color, and indicates a portion of the flight plan of the aircraft through a series of waypoint icons 356. The representative flight plan shown in FIG. 8 passes through a waypoint in SEA (Seattle, Wash.) before proceeding through a waypoint in ELN (Ellensburg, Wash.). It will be appreciated that due to the scale of the display, only a portion of the active flight plan is displayed. By adjusting the scale of the navigation display, however, a pilot may expand or contract the amount of the flight plan that is represented on the screen.

In cooperation with the flight management computer, the alternate destination planner disclosed herein provides a visual display of the alternate destinations that are within the range of the area represented on the navigation display. In particular, for each alternate destination, the alternate destination planner generates a destination icon 360 on the navigation display. The destination icon 360 consists of an "A" in a circle and an adjacent listing of the ICAO destination identifier. It will be appreciated that depending upon the scale of the navigation display and the number of alternate destinations in the area surrounding the aircraft, a greater or lesser number of alternate destinations may be displayed on the screen. Moreover, in a preferred embodiment of the alternate destination planner, a pilot may toggle a switch to display either the closest alternate destination or all four of the alternate destinations contained in the alternate destination summary list.

The position of each destination icon 360 on the display is accurately represented with respect to the location of the aircraft icon, allowing a pilot to estimate the heading and distance to the alternate destination. For example, on the representative screen shown in FIG. 8 it is readily apparent to a pilot that the alternate destination KPDX is the closest alternate destination, and that KPDX lies to the right of the current flight plan at a heading of approximately 170 degrees and a distance of approximately 100 nautical miles. Although an exact comparison of the relative distances and headings to each of the alternate destinations cannot be made by the pilot from the display, the navigation display does provide sufficient information to a pilot to make an initial estimation of the flight maneuver required to divert to each destination.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a flight management computer containing a database of destinations within a region surrounding an aircraft, a method of selecting an alternate destination and implementing a diversion of the aircraft from an active flight plan to an intended destination to a diversion flight plan to the alternate destination, the diversion occurring at a diversion point the method comprising:

(a) searching said database of destinations stored in said flight management computer to identify a plurality of alternate destinations at which the aircraft may land in the region surrounding the aircraft;

(b) determining a flight time along a diversion flight plan to each of the plurality of alternate destinations;

(c) ranking the plurality of alternate destinations in the order of the flight time to each of the plurality of alternate destinations;

(d) displaying the plurality of alternate destinations to a pilot of the aircraft;

(e) enabling the pilot to initiate diversion to a selected one of the plurality of displayed alternate destinations by manipulating a single keyboard input that is linked with the flight management computer; and (f) implementing a diversion to the selected alternate destination by replacing the active flight plan with the diversion flight plan to the selected one of the plurality of alternate destinations.

2. The method of claim 1, further comprising loading the database of destinations into the flight management computer from a ground station.

3. The method of claim 1, wherein searching the database of destinations in said flight management computer to identity a plurality of alternate destinations comprises:

(a) determining the diversion point of the aircraft on the active flight plan;

(b) calculating a distance between the diversion point of the aircraft and each of the destinations in the database of destinations; and (c) identifying a plurality of alternate destinations from the database of destinations that are the closest in distance to the aircraft.

4. The method of claim 1, wherein the flight time of the aircraft along the diversion flight plan to each of the plurality of alternate destinations is determined by dividing the diversion flight plan into a plurality of segments, calculating a flight time for each of the plurality of segments, and summing the flight times for each of the plurality of segments.

5. The method of claim 4, wherein the flight time for each of the plurality of segments is calculated by:

(a) determining a desired speed of the aircraft, the desired speed being enterable by the pilot or being a predetermined value if not entered by the pilot;

(b) determining a desired altitude of the aircraft, the desired altitude being enterable by the pilot or being a predetermined value if not entered by the pilot;

(c) determining an average wind encountered by the aircraft between the diversion point of the aircraft and the alternate destination;

(d) determining an outside air temperature, the outside air temperature being enterable by the pilot or being a predetermined value if not entered by the pilot;

(e) calculating an airspeed of the aircraft using the results of (a)–(d);

(f) calculating a distance between the diversion point of the aircraft and the alternate destination along the diversion flight plan; and (g) calculating a flight time for the segment by dividing the distance by the airspeed of the aircraft.

6. The method of claim 5, wherein the average wind encountered by the aircraft between the diversion point of the aircraft and the alternate destination is a linear interpolation of the wild at the diversion point of the aircraft and the wind at the alternate destination, the wind at the alternate destination being enterable by the pilot.

7. The method of claim 1, wherein displaying the plurality of alternate destinations to said pilot comprises displaying an ordered list of the plurality of alternate destinations from least flight time to greatest flight time.

8. The method of claim 1, wherein displaying the plurality of alternate destinations to said pilot comprises:

(a) displaying an aircraft icon indicative of a position and an orientation of the aircraft on a navigation display; and (b) displaying a location of the plurality of alternate destinations on the navigation display, each of the plurality of alternate destinations displayed at a relative orientation and at a relative distance with respect to the position and orientation of the aircraft icon.

9. The method of claim 8, further comprising displaying the active flight plan of the aircraft on the navigation display.

10. The method of claim 9, further comprising displaying the diversion flight plan of the aircraft on the navigation display after implementing a diversion to the selected alternate destination.

11. The method of claim 1, further comprising enabling the pilot to select a type of diversion flight plan before initiating diversion.

12. The method of claim 11, wherein the type of diversion flight plan is selected from a group of flight plans consisting of direct, offset, and overhead.

13. The method of claim 1, wherein the selected one of the plurality of displayed alternate destinations is selected by the flight management computer.

14. The method of claim 13, wherein the selected one of the plurality of displayed alternate destinations is the alternate destination having a shortest flight time.

15. The method of claim 1, wherein the selected one of the plurality of displayed alternative destinations is selected by the pilot.

16. In a flight management computer containing a database of destinations within a region surrounding an aircraft at which the aircraft may land, a method of identifying from the database of destinations and displaying to a pilot of the aircraft a plurality of alternate destinations for landing the aircraft when the aircraft cannot be landed at its intended destination, the method comprising:

(a) determining a distance between a current position of the aircraft and a location of each destination within said database of destinations stored in said flight management computer;

(b) identifying a plurality of alternate destinations from the database of destinations that are closest in distance to the aircraft;

(c) determining a flight time along a diversion flight plan to each of the plurality of alternate destinations;

(d) ranking the plurality of alternate destinations in the order of the flight time to each of the plurality of alternate destinations;

(e) displaying the plurality of alternate destinations to the pilot; and (f) automatically updating the plurality of alternate destinations upon expiration of a predetermined period of time.

17. The method of claim 16, further comprising loading the database of destinations into the flight management computer from a ground station.

18. The method of claim 16, wherein the flight time of the aircraft along the diversion flight plan to each of the plurality of alternate destinations is determined by dividing the diversion flight plan into a plurality of segments, calculating a flight time for each of the plurality of segments, and summing the flight times for each of the plurality of segments.

19. The method of claim 18, wherein the flight time for each of the plurality of segments is calculated by:

(a) determining a desired speed of the aircraft, the desired speed being enterable by the pilot or being a default value if not entered by the pilot;

(b) determining a desired altitude of the aircraft, the desired altitude being enterable by the pilot or being a default value if not entered by the pilot;

(c) determining an average wind encountered by the aircraft between the diversion point of the aircraft and the alternate destination;

(d) determining an outside air temperature, the outside air temperature being enterable by the pilot or being a default value if not entered by the pilot; (e) calculating an airspeed of the aircraft using the results of (a)–(d);

(f) calculating a distance between the diversion point of the aircraft and the alternate destination along the diversion flight plan; and (g) calculating a flight time for the segment by dividing the distance by the airspeed of the aircraft.

20. The method of claim 19, wherein the average wind encountered by the aircraft between the diversion point of the aircraft and the alternate destination is a linear interpolation of the wind at the diversion point of the aircraft and the wind at the alternate destination, the wind at the alternate destination being enterable by the pilot or being a default value if not entered by the pilot.

21. The method of claim 16, wherein displaying the plurality of alternate destinations to said pilot comprises displaying a list of the plurality of alternate destinations from least flight time to greatest flight time.

22. The method of claim 16, wherein displaying the plurality of alternate destinations to said pilot comprises:

(a) displaying an aircraft icon indicative of a position and an orientation of the aircraft on a navigation display; and (b) displaying a location of the plurality of alternate destinations on the navigation display, each of the plurality of alternate destinations displayed at a relative orientation and at a relative distance with respect to the position and orientation of the aircraft icon.

23. The method of claim 22, further comprising displaying the active flight plan of the aircraft on the navigation display.

24. The method of claim 16, further comprising enabling the pilot to select a type of diversion flight plan.

25. The method of claim 24, wherein the type of diversion flight plan is selected from a group of flight plans consisting of direct, offset, and overhead.

26. The method of claim 16, further comprising selecting one of the plurality of alternate destinations as a preferred alternate destination and providing a visual display to the pilot of the preferred alternate destination selection.

27. The method of claim 26, wherein the preferred alternate destination is selected by the flight management computer.

28. The method of claim 27, wherein the preferred alternate destination is the alternate destination having a shortest flight time.

29. The method of claim 26, wherein the preferred alternate destination is selected by the pilot.

* * * * *

UNITED STATES PATENT AND TRADEMARK OFFICE
CERTIFICATE OF CORRECTION

PATENT NO.   :   5,842,142
DATED        :   November 24, 1998
INVENTOR(S)  :   D.J. Murray et al.

It is certified that error appears in the above-indentified patent and that said Letters Patent is hereby corrected as shown below:

| COLUMN | LINE | |
|---|---|---|
| 21 (Claim 1, | 40 line 6) | After "point" insert --,-- |
| 21 (Claim 3, | 66-67 lines 2-3) | "identity" should read --identify-- |
| 22 (Claim 6, | 39 line 4) | "wild" should read --wind-- |
| 24 (Claim 19, | 3 line 14) | After "pilot;" insert a paragraph return |
| 24 (Claim 19, | 4 line 15) | "of(a)-(d);" should read --of (a)-(d);-- |

Signed and Sealed this

Eighteenth Day of May, 1999

Attest:

Q. TODD DICKINSON

Attesting Officer

Acting Commissioner of Patents and Trademarks